US010889189B2

(12) United States Patent
Yoshida

(10) Patent No.: US 10,889,189 B2
(45) Date of Patent: Jan. 12, 2021

(54) BRAKING FORCE CONTROL APPARATUS FOR VEHICLE

(71) Applicant: TOYOTA JIDOSHA KABUSHIKI KAISHA, Toyota (JP)

(72) Inventor: Kazuaki Yoshida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/150,932

(22) Filed: Oct. 3, 2018

(65) Prior Publication Data

US 2019/0106110 A1    Apr. 11, 2019

(30) Foreign Application Priority Data

Oct. 5, 2017  (JP) ................................ 2017-195165

(51) Int. Cl.
*B60L 7/26*    (2006.01)
*B60W 30/18*   (2012.01)
(Continued)

(52) U.S. Cl.
CPC .............. *B60L 7/26* (2013.01); *B60T 8/171* (2013.01); *B60T 8/172* (2013.01);
(Continued)

(58) Field of Classification Search
CPC .............. B60T 8/245; B60T 8/26–306; B60T 2230/04; B60T 2270/604;
(Continued)

(56) References Cited

U.S. PATENT DOCUMENTS

2003/0062770 A1*  4/2003  Sasaki .................. B60T 13/662
                                                      303/152
2006/0055240 A1*  3/2006  Toyota .................... B60T 1/10
                                                      303/152
(Continued)

FOREIGN PATENT DOCUMENTS

JP    2005028934 A  *  2/2005
JP    2006217677 A  *  8/2006
(Continued)

OTHER PUBLICATIONS

Ajiro—English description of JP-2005028934-A via espacenet patent translate, retrieved May 7, 2020 (Year: 2020).*
(Continued)

*Primary Examiner* — Jeffrey C Boomer
*Assistant Examiner* — Paul Allen
(74) *Attorney, Agent, or Firm* — Sughrue Mion, PLLC

(57) ABSTRACT

A braking force control apparatus for a vehicle has a friction braking device, a regenerative braking device, and a control unit for controlling the friction braking device and the regenerative braking device. The control unit is configured to calculate a target pitch gain of the vehicle so that a pitch gain of the vehicle gradually changes in accordance with a difference between a target braking force of the vehicle and a regenerative braking force when the target braking force of the vehicle exceeds a maximum regenerative braking force and changes within a range larger than the maximum regenerative braking force, and to control a front-rear wheel distribution ratio of a friction braking force so that the pitch gain of the vehicle becomes the target pitch gain and the friction braking force becomes the difference between the target braking force of the vehicle and the maximum regenerative braking force.

7 Claims, 13 Drawing Sheets

(51) Int. Cl.
- *B60T 8/171* (2006.01)
- *B60T 8/172* (2006.01)
- *B60T 8/1755* (2006.01)
- *B60W 10/08* (2006.01)
- *B60W 10/188* (2012.01)

(52) U.S. Cl.
CPC ... *B60T 8/17555* (2013.01); *B60W 30/18127* (2013.01); *B60T 2270/604* (2013.01); *B60W 10/08* (2013.01); *B60W 10/188* (2013.01)

(58) Field of Classification Search
CPC ....... B60T 2270/60–89; B60T 8/17555; B60T 8/17; B60T 8/171; B60T 8/172; B60W 30/18127; B60W 2720/16; B60W 10/188; B60W 10/08; B60L 7/10; B60L 7/18; B60L 7/26; B60L 7/00; Y02T 10/72
USPC ...................................................... 701/70–92
See application file for complete search history.

(56) References Cited

U.S. PATENT DOCUMENTS

| | | | |
|---|---|---|---|
| 2007/0018499 A1* | 1/2007 | Kokubo | B60T 8/4081 303/151 |
| 2010/0094495 A1* | 4/2010 | Fujimoto | B60L 15/2036 701/22 |
| 2012/0323459 A1 | 12/2012 | Okubo | |
| 2013/0211644 A1* | 8/2013 | Yokoyama | B60T 7/22 701/22 |
| 2015/0367824 A1* | 12/2015 | Betz | B60T 8/1766 701/70 |
| 2016/0159225 A1* | 6/2016 | Nakatsu | B60L 7/18 701/71 |
| 2018/0086209 A1* | 3/2018 | Jeon | B60T 8/58 |
| 2018/0093572 A1* | 4/2018 | Hall | B60L 7/26 |

FOREIGN PATENT DOCUMENTS

| | | | | |
|---|---|---|---|---|
| JP | 2006264628 A | * | 10/2006 | |
| JP | 2007161032 A | * | 6/2007 | ......... B60G 17/0195 |
| JP | 2009273275 A | * | 11/2009 | |
| JP | 2015-139293 A | | 7/2015 | |
| WO | 2011/108082 A1 | | 9/2011 | |

OTHER PUBLICATIONS

Sugimoto—English description of JP-2006217677-A via espacenet patent translate, retrieved May 7, 2020 (Year: 2020).*
Okumura, Kazuya—English description of JP-2009273275-A, via Espacenet Patent Translate, Sep. 15, 2020 (Year: 2020).*
Maeda, Yoshinori—English description of JP-2007161032-A, via Espacenet Patent Translate, Sep. 15, 2020 (Year: 2020).*
Maeda, Yoshinori—English description of JP-2006264628-A, via Espacenet Patent Translate, Sep. 15, 2020 (Year: 2020).*

* cited by examiner

BRAKING FORCE CONTROL APPARATUS FOR VEHICLE

CROSS-REFERENCE TO RELATED APPLICATION

The disclosure of Japanese Patent Application NO. JP2017-195165 filed on Oct. 5, 2017 is incorporated by reference in its entirety.

BACKGROUND

1. Technical Field

The present disclosure relates to a braking force control apparatus for a vehicle such as an automobile, and more particularly to a braking force control apparatus for controlling a friction braking force and a regenerative braking force.

2. Description of the Related Art

It is well known to provide a vehicle such as an automobile with a regenerative braking device in addition to a friction braking device and to preferentially generate a regenerative braking force rather than a friction braking force when braking the vehicle in order to improve fuel economy. In particular, in a vehicle provided with a regenerative braking device only on one of the front wheels and the rear wheels, when a ratio of a regenerative braking force and a friction braking force changes, a front-rear wheel distribution ratio of braking force changes and a pitch attitude of the vehicle changes.

For example, Japanese Patent Application Laid-open Publication No. 2015-139293 describes a braking force control apparatus in which a gradient of change in regenerative braking force is limited so as to reduce fluctuations in pitch attitude of a vehicle when a ratio of a regenerative braking force and a friction braking force changes and a front-rear wheel distribution ratio of braking force changes. According to this type of braking force control apparatus, a part of one of a regenerative braking force and a friction braking force is replaced by the other, so that, in a situation where a ratio of the regenerative braking force and the friction braking force changes, it is possible to moderate a change in the ratio and a change in the front-rear wheel distribution ratio of braking force as compared to where a gradient of change in regenerative braking force is not limited. Therefore, it is possible to moderate a change in pitch attitude of the vehicle caused by the change in the front-rear wheel distribution ratio of braking force.

A regenerative braking force generated by a regenerative braking device is limited to be equal to or less than a maximum regenerative braking force and the maximum regenerative braking force varies depending on an operation state of the regenerative braking device. When a braking force required by a driver becomes larger than the maximum regenerative braking force, a braking situation changes from a situation where only the regenerative braking force is generated to a situation where the friction braking force is also generated. Therefore, a friction braking force is added without replacing the regenerative braking force with a friction braking force. Conversely, when a driver-requiring braking force reaches a value smaller than the maximum regenerative braking force from a value greater than the maximum regenerative braking force, the braking situation changes from a situation where a regenerative braking force and a friction braking force are generated to a situation where only a regenerative braking force is generated. Therefore, the friction braking force is reduced without replacing the friction braking force with the regenerative braking force, and further, when the friction braking force becomes zero, the regenerative braking force is reduced.

Thus, when a regenerative braking force and a friction braking force change from a situation in which only the regenerative braking force is generated to a situation in which the friction braking force is also generated, and in the reverse manner, a ratio of the regenerative braking force and the friction braking force inevitably changes. Therefore, in a situation where the regenerative braking force and the friction braking force change as described above, it is not possible to limit a change gradient of the regenerative braking force as by the braking force control device described in the above-mentioned Japanese Patent Application Laid-open Publication.

As described in the above-mentioned Japanese Patent Application Laid-open Publication, when a front-rear wheel distribution ratio of braking force changes in accordance with changes in the regenerative braking force and the friction braking force, a pitch attitude of a vehicle changes. However, as will be described in detail later, since influences of the regenerative braking force and the friction braking force on the pitch attitude of the vehicle are different from each other, even if the front-rear wheel distribution ratio of braking force does not change, the pitch attitude of the vehicle changes when a ratio of the regenerative braking force and the friction braking force changes. Therefore, in a situation where the regenerative braking force and the friction braking force change as described above, it is inevitable that a pitch attitude of the vehicle unnaturally fluctuates due to an abrupt change in the ratio of the regenerative braking force and the friction braking force.

It is to be noted that in a situation where the regenerative braking force and the friction braking force change as described above, if it is attempted to moderate the change in the ratio of the regenerative braking force and the friction braking force, it is forced to sacrifice regenerative braking and it becomes impossible to effectively improve fuel economy. For example, in order to moderate a change in the ratio of the regenerative braking force and the friction braking force when changing from a situation where only the regenerative braking force is generated to a situation where the friction braking force is also generated, the friction braking force must be generated from a time when a driver-requiring braking force is smaller than the maximum regenerative braking force. Conversely, in order to limit a change gradient of the regenerative braking force when changing from a situation where the regenerative braking force and the friction braking force are generated to a situation where only the regenerative braking force is generated, even if a driver-requiring braking force becomes smaller than the maximum regenerative braking force, the friction braking force must be generated.

SUMMARY

The present disclosure provides a braking force control apparatus for a vehicle which is improved to reduce, in a vehicle in which a regenerative braking force is preferentially generated over a friction braking force when braking, a possibility that a pitch attitude of the vehicle unnaturally fluctuates when a ratio of the regenerative braking force and the friction braking force rapidly changes.

According to the present disclosure, a braking force control apparatus for a vehicle is provided which has a friction braking device for imparting friction braking forces to left and right front wheels and left and right rear wheels, a regenerative braking device including at least one of a front wheel regenerative braking device that applies regenerative braking forces to the left and right front wheels and a rear wheel regenerative braking device that applies regenerative braking forces to the left and right rear wheels, and a control unit for controlling the friction braking device and the regenerative braking device, the control unit being configured to control the friction braking device and the regenerative braking device so that a total of the regenerative braking forces becomes a target braking force of the vehicle when the target braking force of the vehicle is equal to or less than a maximum regenerative braking force of the regenerative braking device, and to control the friction braking device and the regenerative braking device so that the total of the regenerative braking forces become the maximum regenerative braking force and the total of the friction braking forces becomes a difference between the target braking force of the vehicle and the maximum regenerative braking force when the target braking force of the vehicle is larger than the maximum regenerative braking force.

The control unit is configured to calculate a target pitch gain of the vehicle so that a pitch gain of the vehicle gradually changes in accordance with a difference between the target braking force of the vehicle and the total of the regenerative braking forces when the target braking force of the vehicle exceeds the maximum regenerative braking force and changes in a range larger than the maximum regenerative braking force, and the control unit is further configured to control a front-rear wheel distribution ratio of the friction braking force so that the pitch gain of the vehicle becomes the target pitch gain and a total of the friction braking forces becomes a difference between the target braking force of the vehicle and the maximum regenerative braking force.

According to the above configuration, when the target braking force of the vehicle exceeds the maximum regenerative braking force, a target pitch gain of the vehicle is calculated such that a pitch gain of the vehicle when the target braking force of the vehicle changes in a range equal to or larger than the maximum regenerative braking force gradually changes in accordance with a difference between the target braking force and the total of the regenerative braking forces of the vehicle. Further, a front-rear wheel distribution ratio of the friction braking force is controlled so that a pitch gain of the vehicle becomes the target pitch gain and a total friction braking force becomes a difference between the target braking force of the vehicle and the maximum regenerative braking force.

Therefore, the target pitch gain when the target braking force of the vehicle changes in a range larger than the maximum regenerative braking force can be changed little by little and smoothly. Accordingly, it is possible to prevent the gain from abruptly changing and to reduce the possibility that a pitch attitude of the vehicle unnaturally fluctuates when a braking situation changes from the situation where only the regenerative braking forces are generated to the situation where the friction braking forces are also generated, and also when the regenerative braking forces and the friction braking forces change in the reverse manner.

Notably, the "pitch gain of the vehicle" is a gain of a braking force with respect to a pitch angle of the vehicle, and the "target pitch gain of the vehicle" is a target pitch gain of a braking force with respect to a target pitch angle of the vehicle.

In one aspect of the present disclosure, the control unit is configured to calculate a target pitch gain by a function having a difference between the target braking force of the vehicle and a total of the regenerative braking forces as a variable so that a pitch gain of the vehicle when the target braking force of the vehicle exceeds the maximum regenerative braking force and increases in a range larger than the maximum regenerative braking force gradually approaches a desired pitch gain.

According to the above aspect, by using the function having a difference between the target braking force of the vehicle and a total of the regenerative braking forces as a variable, a target pitch gain can be calculated so that a pitch gain of the vehicle when the target braking force of the vehicle increases beyond the maximum regenerative braking force gradually approaches a desired pitch gain. Therefore, as the target braking force of the vehicle increases in a range equal to or more than the maximum regenerative braking force, the target pitch gain gradually changes so as to approach the desired pitch gain. Accordingly, when the braking situation changes from the situation where only the regenerative braking forces are generated to the situation where the friction braking forces are also generated, the pitch attitude of the vehicle can be changed little by little and smoothly so as to gradually approach a desired pitch attitude, so that it is possible to effectively reduce the possibility that the pitch attitude of the vehicle unnaturally fluctuates.

It is to be noted that as long as a target pitch gain can be calculated so that a pitch gain of the vehicle when the target braking force of the vehicle exceeds the maximum regenerative braking force and increases in the range equal to or more than the maximum regenerative braking force gradually approaches the desired pitch gain, the function may be an arbitrary function. In particular, as will be described in detail later, the function is preferably a function like a quadratic function so that a rate of change of the target pitch gain according to a change of the target braking force of the vehicle can be reduced as a difference between the target braking force of the vehicle and the total of the regenerative braking forces increases. When the function is a function such as a quadratic function, it is possible to effectively reduce the possibility that the pitch attitude of the vehicle unnaturally fluctuates as compared to where the target pitch gain is calculated by a linear function having as a variable a difference between the target braking force and a total of the regenerative braking forces of the vehicle.

In another aspect of the present disclosure, the function is a function that becomes the desired pitch gain when the target braking force of the vehicle is a preset specified braking force.

According to the above aspect, the target pitch gain becomes the desired pitch gain when the target braking force of the vehicle is a preset specified braking force. Therefore, the target pitch gain can be calculated so that as the target braking force of the vehicle approaches the preset specified braking force, the target pitch gain gradually approaches the desired pitch gain, and when the target braking force of the vehicle is the specified braking force, the target pitch gain becomes the desired pitch gain.

Further, in another aspect of the present disclosure, when the target braking force of the vehicle is larger than the preset specified braking force, the target pitch gain is set to the desired pitch gain.

According to the above aspect, when the target braking force of the vehicle is larger than the preset specified braking force, the target pitch gain is the desired pitch gain. Therefore, the pitch attitude of the vehicle can be kept constant even when the target braking force of the vehicle changes in a range larger than the preset predetermined braking force. Accordingly, unnatural fluctuation of the pitch attitude of the vehicle can be prevented, and the pitch angle of the vehicle can be prevented from becoming excessive.

Further, in another aspect of the present disclosure, the control unit is configured to calculate the target pitch gain as a sum of a pitch gain of the vehicle when the target braking force of the vehicle is equal to or less than the maximum regenerative braking force and a pitch gain correction amount proportional to a difference between the target braking force and a total of the regenerative braking forces of the vehicle.

According to the above aspect, the target pitch gain can be calculated as a sum of a pitch gain of the vehicle when the target braking force of the vehicle is equal to or less than the maximum regenerative braking force and a pitch gain correction amount proportional to a difference between the target braking force of the vehicle and a total of the regenerative braking forces. Therefore, when the target braking force of the vehicle is larger than the maximum regenerative braking force, the target pitch gain can be changed linearly according to a difference between the target braking force of the vehicle and the total of the regenerative braking forces. Accordingly, a ratio of the regenerative braking force and the friction braking force can be prevented from changing stepwise when the braking situation changes from the situation where only the regenerative braking forces are generated to the situation where the friction braking forces are generated, and also when the regenerative braking forces and the friction braking forces change in the reverse manner.

Further, in another aspect of the present disclosure, the pitch gain correction amount is a product of a difference between the target braking force of the vehicle and the total of the regenerative braking forces and a constant coefficient.

According to the above aspect, the pitch gain correction amount is a product of a difference between the target braking force of the vehicle and the total of the regenerative braking forces and a constant coefficient. Therefore, it is possible to calculate the target pitch gain as a value of a linear function having a difference between the target braking force of the vehicle and the total of the regenerative braking forces as a variable.

Further, in another aspect of the present disclosure, the control unit is configured to calculate a target front-rear wheel distribution ratio of the friction braking force on the basis that a target pitch angle of the vehicle determined by the target braking force of the vehicle and the target pitch gain are equal to a sum of a regenerative braking pitch angle of the vehicle determined by a total of the regenerative braking forces and a front-rear wheel distribution ratio of the regenerative braking forces and a friction braking pitch angle of the vehicle determined by a total of the friction braking forces and a front-rear wheel distribution ratio of the friction braking forces, and the control unit is further configured to calculate target friction braking forces of the front wheels and the rear wheels based on the target front-rear wheel distribution ratio of the friction braking forces and a difference between the target braking force of the vehicle and the maximum regenerative braking force, and to control friction braking forces of the front wheels and the rear wheels based on the target friction braking forces of the front wheels and the rear wheels, respectively.

According to the above aspect, a target front-rear wheel distribution ratio of the friction braking forces can be calculated on the basis that a target pitch angle of the vehicle determined by the target braking force of the vehicle and the target pitch gain are equal to a sum of a regenerative braking pitch angle of the vehicle determined by a total of the regenerative braking forces and a front-rear wheel distribution ratio of the regenerative braking forces and a friction braking pitch angle of the vehicle determined by a total of the friction braking forces and a front-rear wheel distribution ratio of the friction braking forces. Further, target friction braking forces of the front wheels and the rear wheels can be calculated based on the target front-rear wheel distribution ratio of the friction braking forces and a difference between the target braking force of the vehicle and the maximum regenerative braking force, and friction braking forces of the front wheels and the rear wheels can be controlled based on the target friction braking forces of the front wheels and the rear wheels, respectively.

Therefore, by controlling the front-rear wheel distribution ratio of the friction braking force without changing the regenerative braking force and the front-rear wheel distribution ratio of the regenerative braking force, it is possible to control the pitch angle of the vehicle to the target pitch angle while controlling the braking force of the vehicle to the target braking force.

Other objects, other features and attendant advantages of the present disclosure will be readily understood from the description of the embodiments of the present disclosure described with reference to the following drawings.

DETAILED DESCRIPTION

[Principle of the Present Disclosure Adopted in Embodiments]

Prior to describing embodiments, the principle of the braking force control in the present disclosure will be described with reference to FIGS. 21 to 25 so as to facilitate understanding of the present disclosure.

<Balance of Pitch Moments>

Figure 21:
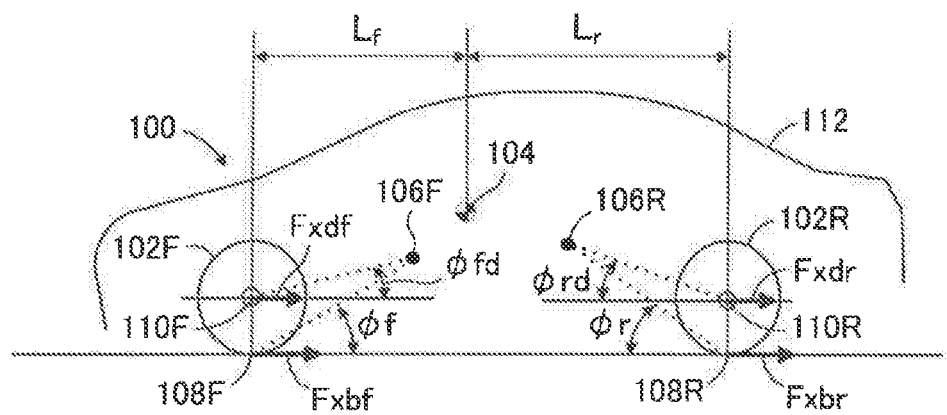
FIG. 21 is a diagram for explaining a balance of pitch moments around the center of gravity of a vehicle.

In FIG. 21, consider a case where a vehicle 100 has a front wheel 102F and a rear wheel 102R, a friction braking force Fxbf and a regenerative braking force Fxdf are applied to the front wheel 102F, and a friction braking force Fxbr and a regenerative braking force Fxdr are applied to the rear wheel 102R. When the regenerative braking force is applied only to the front wheel 102F, the regenerative braking force Fxdr is zero, and when the regenerative braking force is applied only to the rear wheel 102R, the regenerative braking force Fxdf is zero.

A balance of pitch moments around a center of gravity 104 of the vehicle 100 is represented by the following equation (1). In the equation (1) and other equations to be described later, braking forces such as a friction braking force Fxbf are negative values. Further, an equation of balance is established for displacement in the vertical direction of the vehicle, that is, heave. However, it is impossible to control both the pitch moment and the heave by controlling braking forces, and the pitch moment affects an attitude change of the vehicle more than the heave, so that only the pitch moment will be considered.

$$I_p \theta dd = -C_{p\theta}\theta d + C_{pz}zd - K_{s\theta}\theta + K_{sz}z + (L_f \tan\varphi_f - h)Fxbf + \qquad (1)$$
$$(L_r \tan\varphi_r - h)Fxbr + (L_f \tan\varphi_{fd} - h)Fxdf + (L_r \tan\varphi_{rd} - h)Fxdr$$

In the above equation (1), symbols such as $I_p$ are as follows, and some of them are shown in FIG. 21.

$I_p$: Moment of inertia of the vehicle 100 in the pitch direction $C_{p\theta}$: Damping coefficient in the pitch direction around the center of gravity 104 of the vehicle $C_{pz}$: Damping coefficient in the vertical direction at the center of gravity of the vehicle $K_{s\theta}$: Spring constant in the pitch direction around the center of gravity of the vehicle $K_{sz}$: Vertical spring constant at the center of gravity of the vehicle θ: Pitch angle of the vehicle around the center of gravity of the vehicle (front-descending pitch angle is positive)

θdd: Pitch angular acceleration of the vehicle around the center of gravity of the vehicle θd: Pitch angular velocity of the vehicle around the center of gravity of the vehicle z: Vertical displacement of the vehicle at the center of gravity of the vehicle zd: Vertical velocity of the vehicle at the center of gravity of the vehicle $L_f$: Distance in the front-rear direction between the center of gravity and a rotation axis of the front wheel 102F $L_r$: Distance in the front-rear direction between the center of gravity and a rotation axis of the rear wheel 102R h: Height of the center of gravity $\varphi_f$: Angle formed by a line segment connecting an instantaneous center 106F of the front wheel 102F and a grounding contact point 108F of the front wheel with respect to the horizontal direction (anti-dive angle)

$\varphi_r$: Angle formed by a line segment connecting an instantaneous center 106R of the rear wheel 102R and a grounding contact point 108R of the rear wheel with respect to the horizontal direction (anti-lift angle)

$\varphi_{fd}$: Angle formed by a line segment connecting the instantaneous center 106F of the front wheel 102F and a rotation axis 110F of the front wheel with respect to the horizontal direction $\varphi_{rd}$: Angle formed by a line segment connecting the instantaneous center 106R of the rear wheel 102R and a rotational axis 110R of the rear wheel with respect to the horizontal direction <Influence of Braking Force on Pitch Angle of Vehicle>

Although not shown in FIG. 21, the friction braking forces Fxbf and Fxbr are generated by friction braking force generating devices provided on the front wheel 102F and the rear wheel 102R, respectively, and the reaction forces thereof are transmitted to a vehicle body 112 via front and rear wheel suspensions. On the other hand, the regenerative braking forces Fxfd and Fxrd are generated by regenerative braking force generating devices for the front wheels and the rear wheels mounted on the vehicle body 112, and are transmitted to the front wheels and the rear wheels through corresponding axles, respectively, and reaction forces thereof are transmitted from the corresponding regenerative braking force generating devices directly to the vehicle body 112. Therefore, even if a sum of the braking forces of the whole vehicle, that is, a sum of the friction braking force and the regenerative braking force remains unchanged and a front-rear wheel distribution ratio of the braking force remains unchanged, if a ratio of the friction braking force and the regenerative braking force changes, a pitch angle of the vehicle changes.

Generally, the maximum regenerative braking force that can be generated by the regenerative braking force generating device is smaller than the maximum friction braking force that can be generated by the friction braking force generating device. In order to improve fuel consumption of the vehicle, the friction braking force is controlled so that when the braking force of the entire vehicle increases from zero, firstly the regenerative braking force is controlled to be a target braking force, and when the target braking force exceeds the maximum regenerative braking force, a deficient braking force is compensated by the friction braking force. Therefore, when the target braking force increases beyond the maximum regenerative braking force, the ratio of the regenerative braking force and the friction braking force abruptly changes.

Therefore, in a conventional braking force control apparatus, even if the braking forces of the front and rear wheels are controlled so that the sum of the regenerative braking force and the friction braking force becomes the target braking force and a front-rear wheel distribution ratio of the braking forces becomes a predetermined constant ratio, a pitch angle of the vehicle inevitably unnaturally changes when the target braking force increases beyond the maximum regenerative braking force. The same problem arises when a target braking force Fxt decreases from a value larger than the maximum regenerative braking force Fxdmax to a value smaller than the maximum regenerative braking force.

Figure 22:
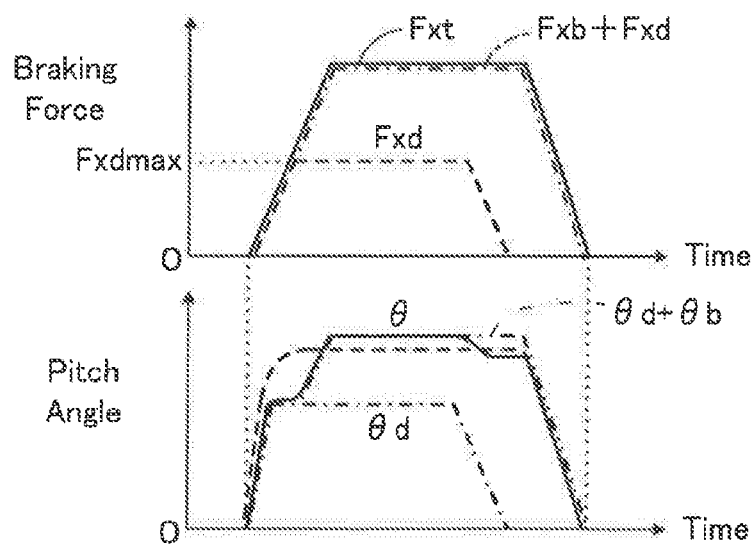
FIG. 22 is a diagram (upper part) showing an example of changes in a target braking force Fxt (solid line), a regenerative braking force Fxd (broken line), the sum (one-dot chain line) of the regenerative braking force Fxd and the friction braking force Fx and a diagram (lower part) showing a change in a pitch angle θ of the vehicle for the cases of prior art and the present disclosure.

For example, it is assumed that a target braking force Fxt of the vehicle changes as shown by the solid line in the upper part of FIG. 22; a regenerative braking force Fxd changes as shown by the broken line; and a sum of the regenerative braking force Fxd and the friction braking force Fxb changes as shown by a one-dot chain line. It is to be noted that when a battery charged with electricity generated by regenerative braking is fully charged, even if the target braking force Fxt is large, the regenerative braking force Fxd may decrease as shown in FIG. 22.

<Change in Pitch Angle of Vehicle>

Assuming that a pitch angle of the vehicle caused by the regenerative braking force Fxd is θr and a pitch angle of the vehicle caused by the friction braking force Fxb is θb, a pitch angle θ of the vehicle when the regenerative braking force Fxd and the friction braking force Fxb are generated is the sum of the pitch angle θr and the pitch angle θb and is expressed by the following equation (2).

$$\theta = \theta r + \theta b \qquad (2)$$

In the situation shown in the upper part of FIG. 22, since the pitch angle θd and a sum of the pitch angles θd+θb vary as indicated by the one-dot chain line and the two-dot chain line, respectively, in the lower part of FIG. 22, the pitch angle θ of the vehicle changes theoretically as shown by the solid line. As shown in the lower part of FIG. 22, when the target braking force Fxt increases beyond the maximum regenerative braking force Fxdmax, the pitch angle θ of the vehicle changes stepwise.

Figure 23:
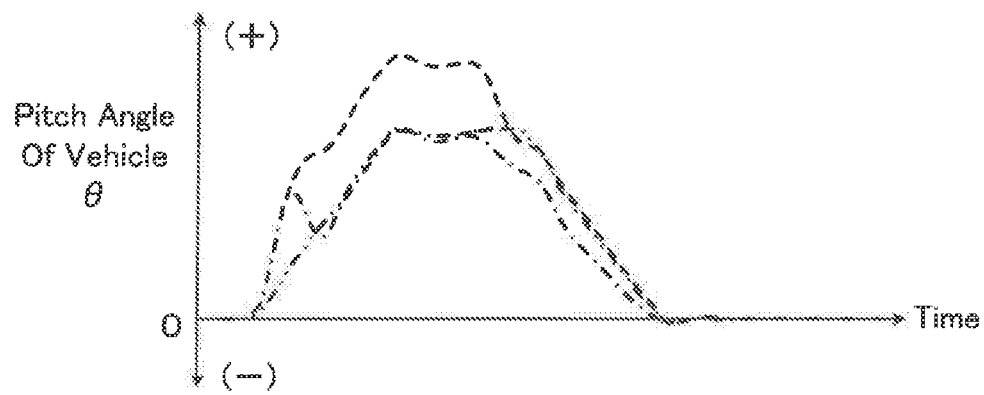
FIG. 23 is a graph showing simulation values of a pitch angle θ of a vehicle in a vehicle in which a regenerative braking force Fxd of a front wheel is generated for the case of an actual braking force distribution (broken line), the case of an ideal braking force distribution (one-dot chain line) and the case of an actual braking force distribution where regenerative braking is not performed (two-dot chain line).

FIG. 23 shows simulation values of the pitch angle θ of the vehicle in which the regenerative braking force Fxd is generated only in the front wheel with respect to an actual braking force distribution (broken line), an ideal braking force distribution (one-dot chain line) and an actual braking force distribution (two-dot chain line) where regenerative braking is not performed. As shown in FIG. 23, in the situation where the regenerative braking is performed, particularly where the front-rear wheel distribution ratio of the braking force is an ideal distribution, when the target braking force Fxt increases beyond the maximum regenerative braking force Fxdmax, the pitch angle θ of the vehicle unnaturally changes.

As understood from the above equation (1), if the ratio of the regenerative braking forces Fxdf and Fxdr of the front and rear wheels, that is, the front-rear wheel distribution ratio of regenerative braking force is changed without changing the magnitude of a sum Fxd of the regenerative braking forces, the pitch angle θ can be adjusted without changing the regenerative braking force Fxd. Similarly, if the ratio of the friction braking forces Fxbf and Fxbr, that is, the front-rear wheel distribution ratio of friction braking force is changed without changing a sum Fxb of the friction braking forces, the pitch angle θ can be adjusted without changing the magnitude of the friction braking force Fxb. Therefore, if a front-rear wheel distribution ratio of the regenerative braking force Fxd or the friction braking force Fxb is controlled so that the pitch angle θ of the vehicle gradually and smoothly changes when the target braking force Fxt increases beyond the maximum regenerative braking force Fxdmax, it is possible to avoid unnatural change of the pitch angle θ of the vehicle.

However, in order to improve a fuel efficiency of the vehicle, it is necessary to preferentially generate the regenerative braking force rather than the friction braking force. Further, the maximum allowable value of the regenerative braking force Fxd, that is, the maximum regenerative braking force Fxdmax changes depending on a regeneration situation such as a charge amount of a battery. Therefore, since a degree of freedom of fluctuation of the maximum regenerative braking force Fxdmax needs to be secured, it is not preferable to control the front-rear wheel distribution ratio of the regenerative braking force Fxd, that is, the ratio of the regenerative braking forces Fxdf and Fxdr in order to adjust the pitch angle θ of the vehicle. Accordingly, consider to control the front-rear wheel distribution ratio of the friction braking force Fxb, that is, the ratio of the friction braking forces Fxf and Fxr so that the pitch angle θ of the vehicle changes smoothly as shown by the broken line in the lower part of FIG. 22 and in FIG. 24 when the target braking force Fxt increases beyond the maximum regenerative braking force Fxdmax.

<Target Pitch Gain Kt>

As understood by solving the equation (1) with respect to the pitch angle θ, the target pitch angle θt(s) of the vehicle is expressed by the following equation (3). In the equation (3), Kt is a target pitch gain of the target braking force Fxt(s) with respect to the target pitch angle θt(s), and s is the Laplace operator. Cp is a damping coefficient in the pitch direction around the center of gravity 104 of the vehicle and is determined by the damping coefficients Cpθ and Cpz. Kp is a spring constant in the pitch direction around the center of gravity 104 of the vehicle and is determined by the spring constants Ksθ and Ksz.

$$\theta t(s) = \frac{1}{Ips^2 + Cps + Kp} KtFxt(s) \qquad (3)$$

Since the inertia moment $I_p$ in the pitch direction of the vehicle 100, the damping coefficient Cp, and the spring constant Kp are constant, as can be seen from the above equation (3), a relationship between the target braking force Fxt and the target pitch angle θt of the vehicle, that is, a pitch characteristic of the vehicle is determined by the target pitch gain Kt.

When the target braking force Fxt is equal to or less than the maximum regenerative braking force Fxdmax, the pitch characteristic of the vehicle is the pitch characteristic when only regenerative braking is executed. On the other hand, when the target braking force Fxt is larger than the maximum regenerative braking force Fxdmax, the pitch characteristic of the vehicle is the pitch characteristic when the regenerative braking and the friction braking are executed. Therefore, in order to prevent the pitch angle θ from unnaturally changing, it is sufficient to set the target pitch gain Kt such that the pitch angle θ of the vehicle changes gradually, that is, it changes little by little and smoothly when the target braking force Fxt exceeds the maximum regenerative braking force Fxdmax from a value less than the maximum regenerative braking force and changes in the reverse manner.

(A) When the Target Braking Force Fxt is Equal to or Less than the Maximum Regenerative Braking Force Fxdmax:

Since the friction braking forces Fxbf and Fxbr are zero, by solving the equation (1) for the pitch angle θ, the pitch angle θd(s) of the vehicle when only the regenerative braking force Fxd is generated is given by the following equation (4). Therefore, if a steady pitch gain of the vehicle when only the regenerative braking force is generated is assumed as Kre (a positive constant), since the target pitch gain Kt is Kre, it is expressed by the following equation (5). In the equations (4) and (5), Rre is a front wheel distribution ratio of the regenerative braking force Fxd (a positive constant that is greater than or equal to 0 and less than or equal to 1), and Tfd and Trd are the values represented by the following equations (6) and (7), respectively.

$$\theta d(s) = \frac{1}{Ips^2 + Cps + Kp} \{(Tfd - Trd)Rre + Trd\}Fxd(s) \qquad (4)$$

$$Kt = Kre = (Tfd - Trd)Rre + Trd \qquad (5)$$

$$Tfd = Lf\tan\phi_{fd} - h \qquad (6)$$

$$Trd = Lr\tan\phi_{rd} - h \qquad (7)$$

Figure 25:
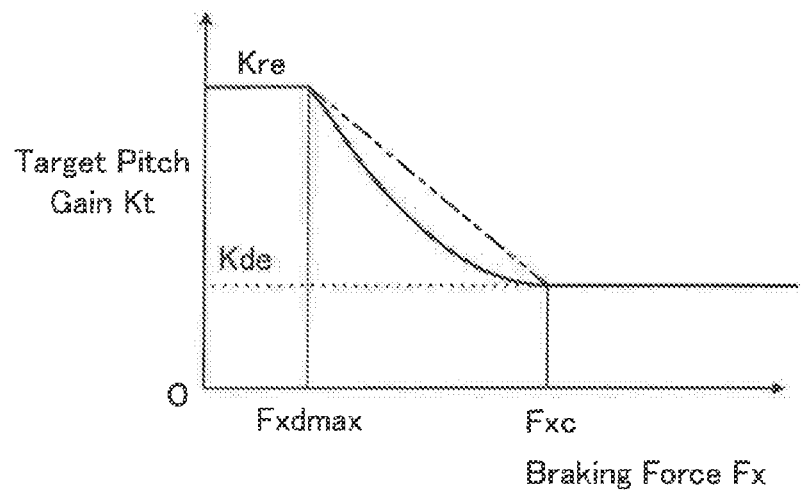
FIG. 25 is a diagram showing a relationship between a braking force Fx and a target pitch gain Kt.

(B) When the Target Braking Force Fxt is Larger than the Maximum Regenerative Braking Force Fxdmax:

It is preferable that the pitch angle θ of the vehicle does not become excessive when the target braking force Fxt is large. Therefore, as shown in FIG. 25, it is preferable that the target pitch gain Kt is set to decrease as the braking force Fxt increases when the target braking force Fxt is larger than the maximum regenerative braking force Fxdmax and less than the preset reference value Fxc (a positive constant), but is set constant when the target braking force Fxt is equal to or greater than the reference value Fxc. Furthermore, it is preferable that in order to smoothly change the pitch angle θ of the vehicle when the target braking force Fxt increases in a range greater than the maximum regenerative braking force Fxdmax and when it changes in the reverse manner, the target pitch gain Kt draws a downwardly convex curve as shown in FIG. 25. The reference value Fxc may be, for example, a braking force corresponding to a vehicle deceleration of 1 gravitational acceleration.

In the first embodiment, the target pitch gain Kt when the target braking force Fxt is equal to or greater than the reference value Fxc is set to a value represented by the following formula (8) wherein Kde is a guard value of the target pitch gain Kt (a positive constant equal to or less than Kre), and ΔFx is a difference between the reference values Fxc and the maximum regenerative braking force Fxdmax.

$$Kt = \frac{Kre - Kde}{\Delta Fx^2} \{(Fxt - Fxd) - \Delta Fx\}^2 + Kde \qquad (8)$$

The target pitch gain Kt expressed by the equation (8) is a quadratic function of a friction braking force Fxb, that is, a difference Fxt−Fxd between the target braking force Fxt and the regenerative braking force Fxd and becomes the minimum value when the target braking force Fxt is the preset reference value Fxc. As shown in FIG. 25, the target pitch gain Kt is calculated according to the above equation (8) when the target braking force Fxt is larger than the maximum regenerative braking force Fxdmax and less than the reference value Fxc, and is set to the guard value Kde when the target braking force Fxt is equal to or greater than the reference value Fxc.

If the target pitch gain Kt is set so that the pitch angle θb(s) of the vehicle caused by the friction braking force Fx is smaller than the pitch angle θd(s) of the vehicle caused by the regenerative braking force Fxd, it is inevitable that the pitch angle θ of the vehicle unnaturally changes when the target braking force Fxt exceeds the maximum regenerative braking force Fxdmax from a value less than the maximum regenerative braking force and changes in the reverse manner. Therefore, since θb(s)≥θd(s) is preferable, the target pitch gain Kt is preferably a value that satisfies the following equation (9).

$$Kt \leq Kre \cdot Fxd\text{max}/Fxc \qquad (9)$$

<Target Front Wheel Distribution Ratio of Friction Braking Force>

Since the friction braking force Fxb(s) is Fxt(s)−Fxd(s), assuming that the target front wheel distribution ratio of the friction braking force is Rbt, the pitch angle θb(s) of the vehicle caused by the friction braking force is expressed by the following equation (10). In the equation (10), Tf and Tr are values represented by the following equations (11) and (12), respectively. The target braking force Fxt(s) is a value larger than the maximum regenerative braking force Fxdmax.

$$\theta b(s) = \frac{1}{Ips^2 + Cps + Kp}\{(Tf - Tr)Rbt + Tr\}(Fxt(s) - Fxd(s)) \quad (10)$$

$$Tf = Lf \tan \phi_f - h \quad (11)$$

$$Tr = Lr \tan \phi_r - h \quad (12)$$

From the above equation (2), the following equation (13) holds. Substituting the above equations (3), (4) and (10) into the following equation (13) and solving the obtained equation for the target front wheel distribution ratio Rbt of the friction braking force, the target front wheel distribution ratio Rbt can be obtained by the equation (14).

$$\theta b(s) = \theta t(s) - \theta d(s) \quad (13)$$

$$Rbt = \frac{KtFxt - \{(Tfd - Trd)Rre + Trd\}Fxd - Tr(Fxt - Fxd)}{(Tf - Tr)(Fxt - Fxd)} \quad (14)$$

As understood from the above explanation, when the target braking force Fxt is larger than the maximum regenerative braking force Fxdmax, by calculating the target front wheel distribution ratio Rbt according to the above equation (14), and distributing the target friction braking force Fxbt (=Fxt−Fxdmax) to the front and rear wheels based on the target front wheel distribution ratio Rbt, the possibility that the pitch angle θ of the vehicle unnaturally changes can be reduced.

EMBODIMENTS

Next, some embodiments of the present disclosure will be described in detail.

First Embodiment

Figure 1:
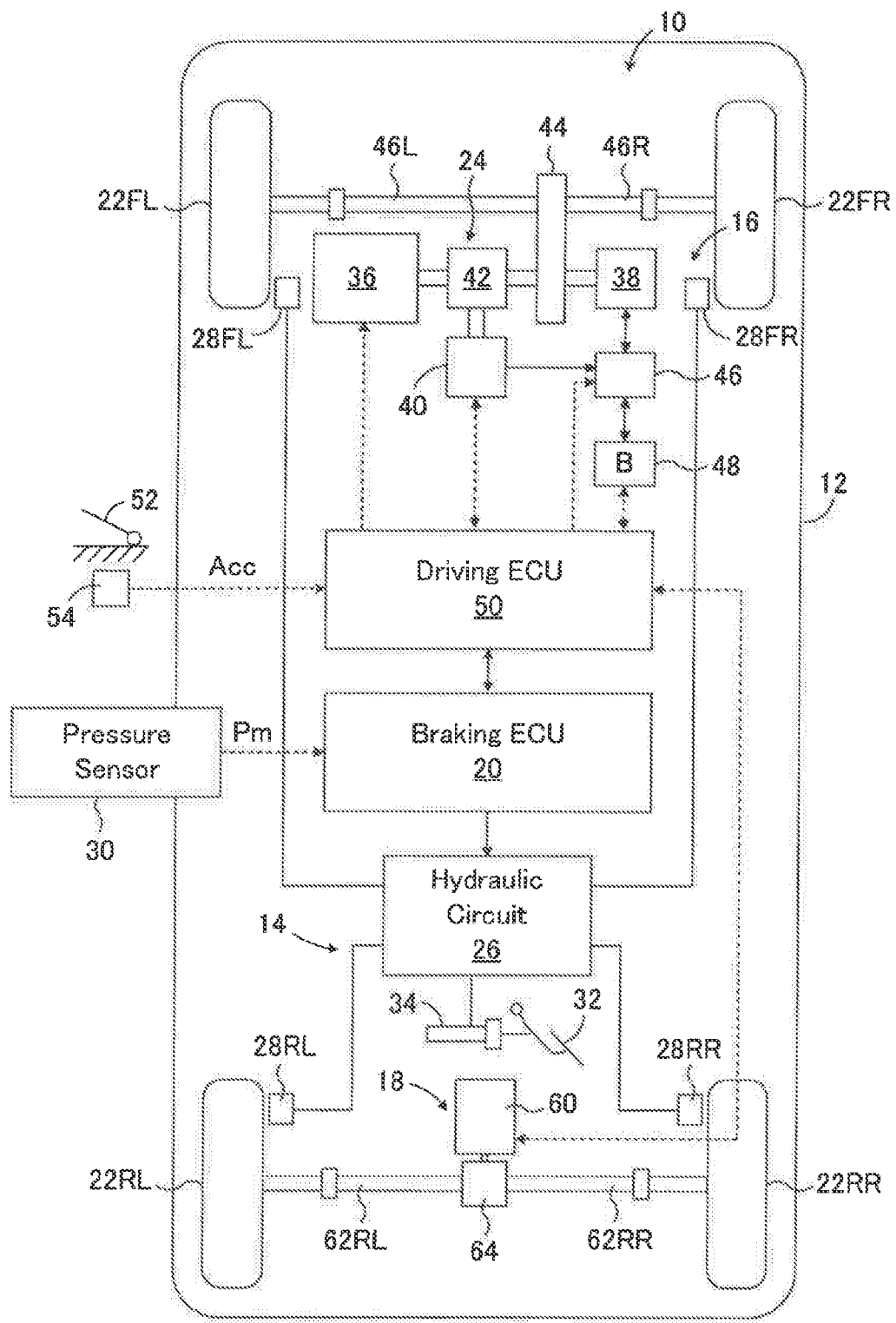
FIG. 1 is a schematic configuration diagram showing a first embodiment of a vehicle braking force control apparatus according to the present disclosure having a front wheel regenerative braking device and a rear wheel regenerative braking device.

As shown in FIG. 1, the braking force control apparatus 10 according to the first embodiment is adapted to a vehicle 12 with a hybrid system. The braking force control apparatus 10 includes a friction braking device 14, a front wheel regenerative braking device 16, a rear wheel regenerative braking device 18, a braking electronic control unit (ECU) 20 as a control device for controlling the friction braking device and the regenerative braking devices. The friction braking device 14 applies friction braking forces to left and right front wheels 22FL, 22FR and left and right rear wheels 22RL, 22RR. The front wheel regenerative braking device 16 is a part of the hybrid system 24 and applies a regenerative braking forces to the left and right front wheels 22FL and 22FR. The rear wheel regenerative braking device 18 applies regenerative braking forces to the left and right rear wheels 22RL and 22RR.

Although not shown in the drawing, the vehicle 12 has a center of gravity between the left and right front wheels 22FL, 22FR and the left and right rear wheels 22RL, 22RR as seen in the lateral direction, and a height of the center of gravity is larger than a height of the rotation axes of the front wheels and the rear wheels. Furthermore, an angle formed by a line segment connecting instantaneous centers of the front wheels and the rotation axes as seen in the lateral direction with the horizontal direction is an anti-dive angle as in FIG. 21, and an angle formed by a line segment connecting instantaneous centers of the rear wheels and the rotation axes with respect to the horizontal direction is an anti-lift angle as in FIG. 21.

Braking forces of the left and right front wheels 22FL and 22FR and the left and right rear wheels 22RL and 22RR are controlled by controlling braking pressures of corresponding wheel cylinders 28FL, 28FR, 28RL and 28RR by a hydraulic circuit 26 of the friction braking device 14. Although not shown in the drawing, the hydraulic circuit 26 includes a reservoir, an oil pump, various valve devices, and the like, and functions as a brake actuator controlled by the braking electronic control unit 20. A signal indicative of a master cylinder pressure Pm detected by a pressure sensor 30, that is, a signal indicative of the pressure in a master cylinder 34 driven in response to a depression operation of a brake pedal 32 by a driver is input to the braking electronic control unit 20. The braking pressure of each wheel cylinder is normally controlled by the braking electronic control unit 20 based on the master cylinder pressure Pm and is individually controlled as required.

The hybrid system 24 has an engine 36 which is an internal combustion engine and an electric motor 38 which can also function as a generator. Further, the hybrid system 24 has a generator (electric motor generator) 40 that receives power from the engine 36 to generate electricity, and the engine 36 and the generator 40 are connected to each other by a power dividing mechanism 42.

The power dividing mechanism 42 and the electric motor 38 are connected to each other via a speed reducer 44. The speed reducer 44 includes a differential (not shown) and is connected to the left and right front wheels 22FL and 22FR via drive shafts 46L and 46R, respectively. Notably, the left and right front wheels 22FL and 22FR are driving wheels and steered wheels, and are steered through a steering mechanism by the driver operating a steering wheel (not shown).

The power dividing mechanism 42 distributes an output of the engine 36 to the generator 40 and the speed reducer 44. The speed reducer 44 decelerates the output of the engine 36 and/or the output of the electric motor 38 transmitted via the power split mechanism 42, and transmits the reduced speed to the left and right front wheels 22FL and 22FR via the drive shafts 46L and 46R. The power dividing mechanism 42 also functions as a driving force dividing unit that divides the output of the engine 36 into an output to the generator 40 and a driving force for running the vehicle 12.

The electric motor 38 is an AC synchronous motor, and is driven by AC power supplied from an inverter 46. The electric motor 38 also functions as a regenerative generator by being driven by the rotation of the left and right front wheels 22FL and 22FR and imparts the regenerative braking force Fxdf to the left and right front wheels 22FL and 22FR. The electric power generated by the electric power generation of the electric motor 38 is converted from alternating current to direct current by the inverter 46 and charged into a chargeable/dischargeable battery 48. Therefore, the front wheel regenerative braking device 16 is composed of the electric motor 38, the speed reducer 44, the inverter 46, and the like.

The inverter 46 converts electric power stored in the battery 48 from direct current to alternating current and supplies it to the electric motor 38, and also converts electric power generated by the electric generator 40 being driven by the output of the engine 36 from alternating current to direct current and charge it into the battery 48. Therefore, the battery 48 functions as a power source for driving the electric motor 38 and as an electric storage means for storing the electricity generated by the generator 40. It is to be noted that the generator 40 has a structure as an AC synchronous motor like the above-described electric motor 38, and mainly performs power generation by receiving the output of the engine 36, but if necessary, power from the battery 48 via the inverter 46, so that it can also function as an electric motor.

The engine 36, the electric motor 38, the generator 40, the inverter 46 and the like of the hybrid system 24 are controlled by a driving electronic control unit (ECU) 50. A signal indicating the accelerator opening degree Acc is input to the driving electronic control unit 50 from an accelerator opening degree sensor 54 provided on an accelerator pedal 52 operated by the driver. The driving electronic control unit 50 controls an output of the hybrid system 24 based on the accelerator opening degree Acc, a vehicle speed, and the like, and thereby controls driving forces applied to the left and right front wheels 22FL and 22FR.

As shown in FIG. 1, the rear wheel regenerative braking device 18 includes a motor generator 60. Rotation of the left and right rear wheels 22RL and 22RR, which are driven wheels, is transmitted to the motor generator 60 via left and right rear wheel axles 62RL and 62RR and a rear wheel differential gear unit 64. Motor generator 60 functions as a regenerative generator and applies regenerative braking force Fxdr to left and right rear wheels 22RL and 22RR. Although not shown in FIG. 1, electric power generated by electric power generation by regenerative braking of the motor generator 60 is also converted from alternating current to direct current by the inverter 46 and charged into the battery 48.

The braking electronic control device 20 and the driving electronic control device 50 exchanges information and commands with each other as necessary. Each of the electronic control devices 20 and 50 may be a device including a microcomputer having a CPU, a ROM, a RAM, and an input/output port device, which are connected to each other by a bi-directional common bus.

When applying the regenerative braking force Fxdf to the left and right front wheels 22FL and 22FR by the front wheel regenerative braking device 16 of the hybrid system 24, the braking electronic control device 20 controls the front wheel regenerative braking device 16 via the driving electronic control device 50. Similarly, when applying the regenerative braking force Fxdr to the left and right rear wheels 22RL and 22RR by the rear wheel regenerative braking device 18, the braking electronic control device 20 controls the rear wheel regenerative braking device 18 via the driving electronic control device 50.

Figure 2:
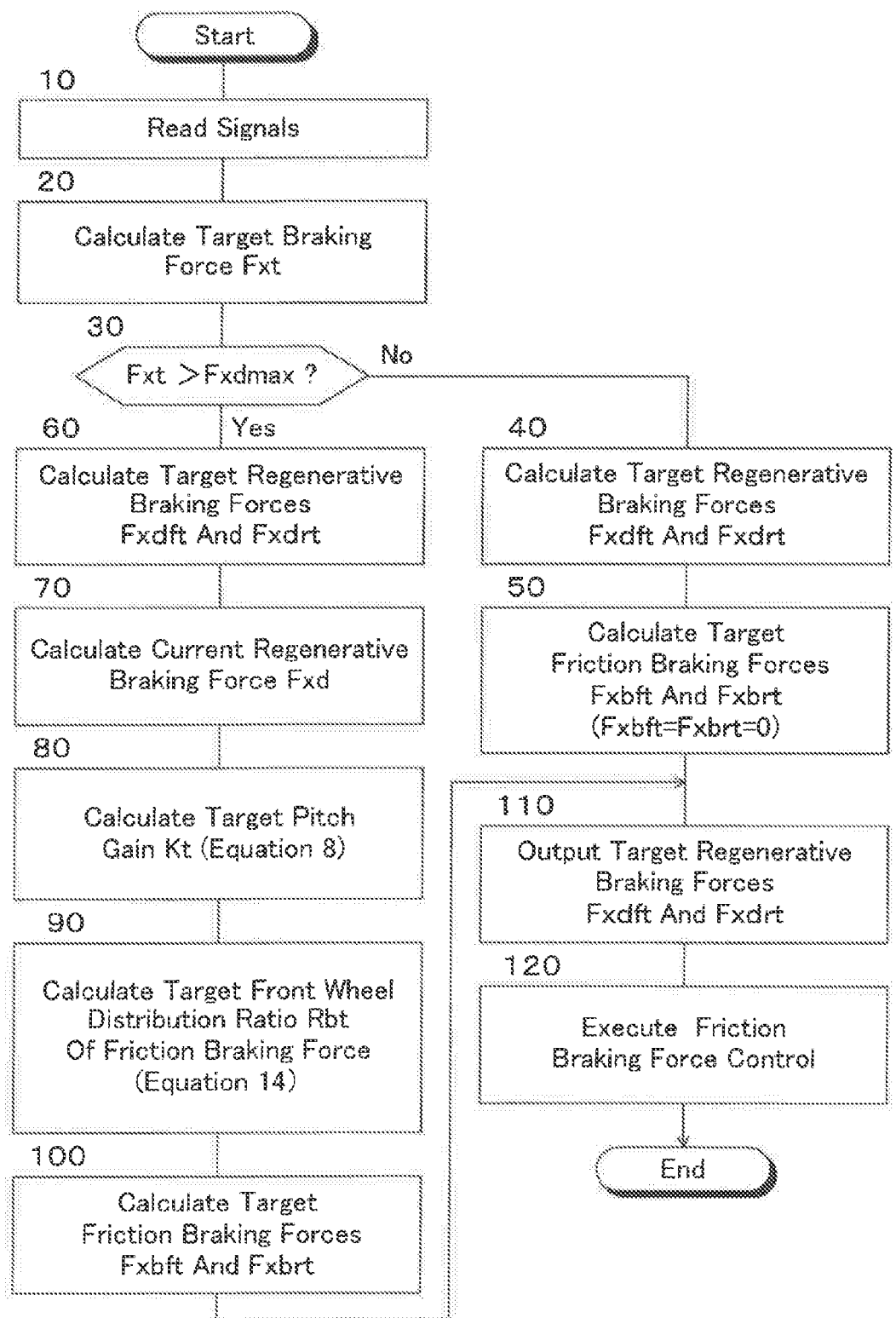
FIG. 2 is a flowchart showing a braking force control routine according to the first embodiment.

In the first embodiment, the ROM of the braking electronic control device 20 stores a braking force control program corresponding to the flowchart shown in FIG. 2. The CPU of the braking electronic control device 20 controls the regenerative braking forces Fxdf, Fxdr and the friction braking forces Fxbf, Fxbr applied to the left and right front wheels 22FL, 22FR and the left and right rear wheels 22RL, 22RR according to the control program.

In particular, when the target braking force Fxt of the vehicle 12 is greater than the maximum regenerative braking force Fxdmax, the braking electronic control unit 20 calculates a target pitch gain Kt in accordance with the above equation (8) and calculates a target front wheel distribution ratio Rbt of the friction braking force according to the above equation (14). Further, the braking electronic control unit 20 distributes the target friction braking force Fxbt (=Fxt−Fxdmax) to the front and rear wheels based on the target front wheel distribution ratio Rbt, and thereby reduces the possibility that the pitch angle θ of the vehicle unnaturally changes as compared to where the front wheel distribution ratio of the friction braking force is constant.

Next, the braking force control routine in the first embodiment will be described with reference to the flowchart shown in FIG. 2. The control according to the flowchart shown in FIG. 2 is repeatedly executed at predetermined time intervals by the braking electronic control unit 20 when an ignition switch (not shown) is ON.

First, in step 10, a signal indicating a master cylinder pressure Pm detected by the pressure sensor 30 and the like are read. In step 20, a target braking force Fxt of the vehicle 12, which is a driver-requiring braking force, is calculated based on the master cylinder pressure Pm. The target braking force Fxt may be calculated based on a pedaling force applied to the brake pedal 32.

In step 30, a maximum regenerative braking force Fxdmax is calculated as a sum of a maximum front wheel regenerative braking force Fxdfmax of the front wheel regenerative braking device 16 and a maximum rear wheel regenerative braking force Fxdrmax of the rear wheel regenerative braking device 18. The maximum front wheel regenerative braking force Fxdfmax and the maximum rear wheel regenerative braking force Fxdrmax are maximum regenerative braking forces that can be generated by the front wheel regenerative braking device 16 and the rear wheel regenerative braking device 18, respectively when the braking force Fx of the vehicle 12 is the target braking force Fxt. When a charge amount of the battery 48 is equal to or higher than a reference value, the maximum front wheel regenerative braking force Fxdfmax and the maximum rear wheel regenerative braking force Fxdrmax are controlled by the driving electronic control unit 50 such that the charge amount of the battery 48 is smaller than that when it is less than the reference value. Information on the maximum front wheel regenerative braking force Fxdfmax and the maximum rear wheel regenerative braking force Fxdrmax is input from the driving electronic control unit 50 to the braking electronic control unit 20.

Further, in step 30, it is determined whether or not the target braking force Fxt of the vehicle 12 is greater than the maximum regenerative braking force Fxdmax, that is, whether or not it is necessary to generate friction braking forces in addition to the regenerative braking forces. When an affirmative determination is made, the braking force control proceeds to step 60, and when a negative determination is made, the braking force control proceeds to step 40.

In step 40, assuming a front wheel distribution ratio of the regenerative braking force is Rre (in this embodiment, a positive constant larger than 0 and smaller than 1), a target regenerative braking force Fxdft of the front wheels and a target regenerative braking force Fxdrt of the rear wheels are calculated according to the following equations (15) and (16), respectively.

$$Fxdft = Rre \cdot Fxt \tag{15}$$

$$Fxdrt = (1-Rre)Fxt \tag{16}$$

In step 50, there is no need to generate a front wheel friction braking force Fxbf and a rear wheel friction braking force Fxbr, so that the target front friction braking force Fxbft and the rear wheel target friction braking force Fxbrt are each set to zero.

In step 60, a target regenerative braking force Fxdft of the front wheels and a target regenerative braking force Fxdrt of the rear wheels are calculated according to the following equations (17) and (18), respectively.

$$Fxdft = Rre \cdot Fxdmax \tag{17}$$

$$Fxdrt = (1-Rre)Fxdmax \tag{18}$$

In step 70, a current regenerative braking force Fxd is calculated as a sum of a current front wheel regenerative braking force Fxdf and a current rear wheel regenerative braking force Fxdr. The information on the current front wheel regenerative braking force Fxdf and the current rear wheel regenerative braking force Fxdr is input from the driving electronic control unit 50 to the braking electronic control unit 20.

In step 80, when the target braking force Fxt is less than a reference value Fxc (a positive constant), a target pitch gain Kt is calculated according to the above equation (8) based on a difference Fxt−Fxd between the target braking force Fxt of the vehicle 12 and the current regenerative braking force Fxd. On the other hand, when the target braking force Fxt is equal to or greater than the reference value Fxc, the target pitch gain Kt is set to the guard value Kde. Notably, the current regenerative braking force Fxd is substantially the same as the maximum regenerative braking force Fxdmax. Therefore, the target pitch gain Kt may be calculated according to the following equation (19) corresponding to the above equation (8).

$$Kt = \frac{Kre - Kde}{\Delta Fx^2}\{(Fxt - Fxd\max) - \Delta Fx\}^2 + Kde \quad (19)$$

In step 90, based on the target braking force Fxt of the vehicle 12, the current regenerative braking force Fxd, the front wheel distribution ratio Rre of the regenerative braking force and the target pitch gain Kt, a target front wheel distribution ratio Rbt of the friction braking force is calculated according to the above equation (14).

In step 100, a target friction braking force Fxbft of the front wheels and a target friction braking force Fxbrt of the rear wheels are calculated according to the following equations (20) and (21), respectively.

$$Fxbft = Rbt(Fxt - Fxd) \quad (20)$$

$$Fxbrt = (1 - Rbt)(Fxt - Fxd) \quad (21)$$

In step 110, signals indicating the target regenerative braking force Fxdft of the front wheels and the target regenerative braking force Fxdrt of the rear wheels calculated in step 40 or 60 are output to the driving electronic control unit 50. Upon receiving the signals indicating the target regenerative braking forces Fxdft and Fxdrt, the driving electronic control unit 50 controls the front wheel regenerative braking device 16 and the rear wheel regenerative braking device 18 so that a regenerative braking forces Fxdf and Fxdr of the front wheels and the rear wheels become the target regenerative braking forces Fxdft and Fxdrt, respectively.

In step 120, the friction braking device 14 is controlled so that a friction braking force Fxbf of the front wheels and a friction braking force Fxbr of the rear wheels become the target friction braking forces Fxbft and Fxbrt, respectively.

<Operation of First Embodiment>

Next, the operation of the braking force control apparatus 10 according to the first embodiment configured as described above will be described.

<(A1) When the Target Braking Force Fxt is Equal to or Less than the Maximum Regenerative Braking Force Fxdmax:>

A negative determination is made in step 30 and steps 40, 50 and steps 110, 120 are executed. Therefore, the front wheel regenerative braking force Fxdf and the rear wheel regenerative braking force Fxdr are generated by the front wheel regenerative braking device 16 and the rear wheel regenerative braking device 18 at the front wheel distribution ratio Rre. No friction braking force is generated by the friction braking device 14.

<(B1) When the Target Braking Force Fxt is Larger than the Maximum Regenerative Braking Force Fxdmax:>

An affirmative determination is made in step 30 and steps 60 to 100 and steps 110 and 120 are executed. In step 60, a target regenerative braking force Fxdft of the front wheels and a target regenerative braking force Fxdrt of the rear wheels are calculated, and in step 70, a current regenerative braking force Fxd is calculated. In step 80, a target pitch gain Kt is calculated based on the difference Fxt−Fxd between the target braking force Fxt of the vehicle 12 and the current regenerative braking force Fxd, and in step 90, a target front wheel distribution ratio Rbt of the friction braking force is calculated based on the target pitch gain Kt and the like. In step 100, a target friction braking force Fxbft of the front wheels and a target friction braking force Fxbrt of the rear wheels are calculated.

Further, in step 110, regenerative braking forces of the front and rear wheels are controlled so that a sum of the regenerative braking force Fxdf of the front wheels and the regenerative braking force Fxdr of the rear wheels becomes the maximum regenerative braking force Fxdmax and the front wheel distribution ratio of the regenerative braking force becomes Rre. In step 120, friction braking forces Fxbf of the front and rear wheels and the friction braking forces Fxbr of the rear wheels are controlled so that a sum of the friction braking forces Fxbf of the front wheels and the friction braking forces Fxbr of the rear wheels becomes Fxt−Fxdmax and the front wheel distribution ratio of the friction braking force becomes Rbt.

Figure 24:
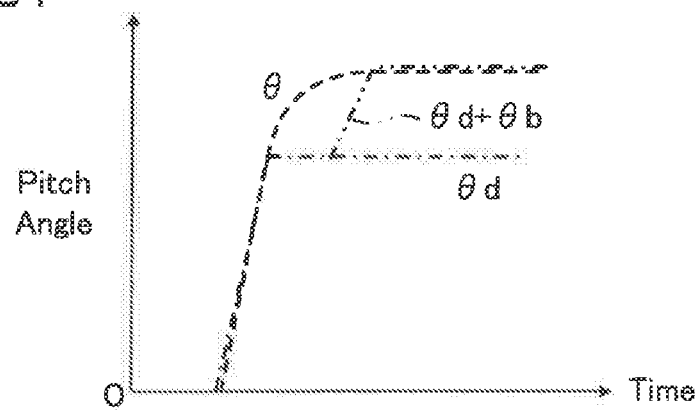
FIG. 24 is an enlarged partial view showing a main part of a change in the pitch angle θ of the vehicle shown in the lower part of FIG. 22.

Therefore, in situations where the target braking force Fxt increases beyond the maximum regenerative braking force Fxdmax, the target pitch gain Kt is set so that the pitch angle θ of the vehicle changes little by little and smoothly as shown by the broken line in the lower part of FIG. 22 and in FIG. 24. Similarly, even in a situation where the target braking force Fxt decreases from a value greater than the maximum regenerative braking force Fxdmax to less than the maximum regenerative braking force Fxdmax, the target pitch gain Kt is set so that the pitch angle θ of the vehicle changes little by little and smoothly. Therefore, since the pitch angle θ of the vehicle can be changed little by little and smoothly when the target braking force Fxt exceeds the maximum regenerative braking force Fxdmax from a value less than the maximum regenerative braking force and changes in the reverse manner, it is possible to reduce the possibility that the pitch angle θ of the vehicle unnaturally changes.

<Example in which Regenerative Braking is Performed>

Figure 3:
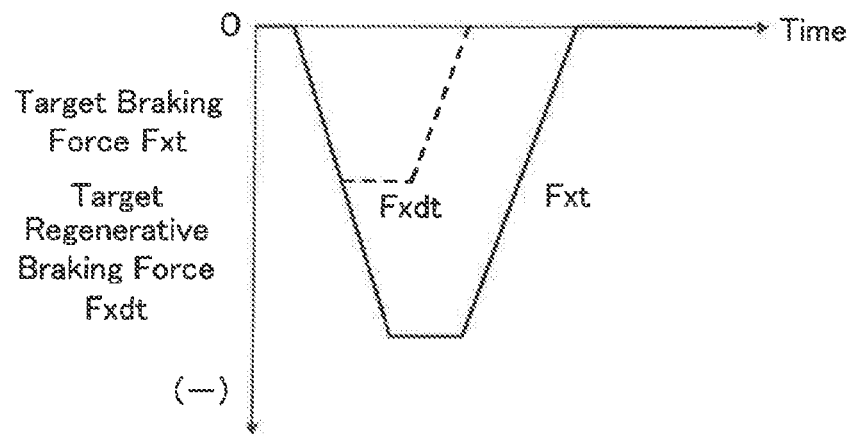
FIG. 3 is a diagram showing an example of a change in a target braking force Fxt (solid line) and a target regenerative braking force Fxdt (broken line) in the first embodiment.
Figure 4:
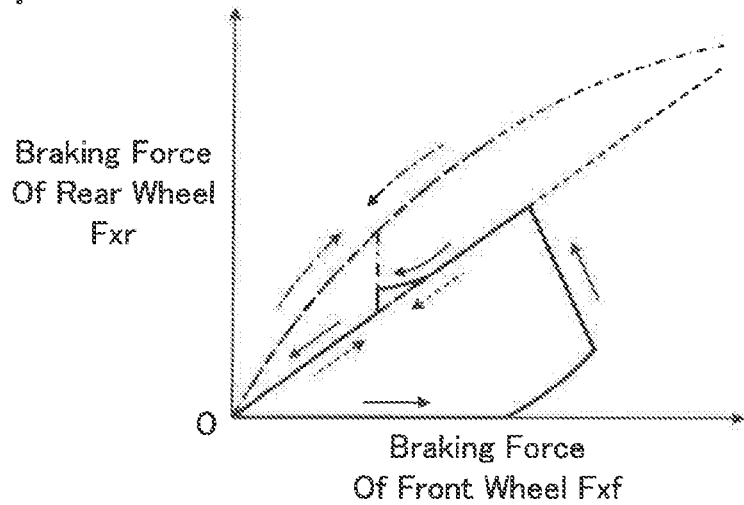
FIG. 4 is a diagram showing changes in distribution of a front wheel braking force Fxf and a rear wheel braking force Fxr for the example of FIG. 3.
Figure 5:
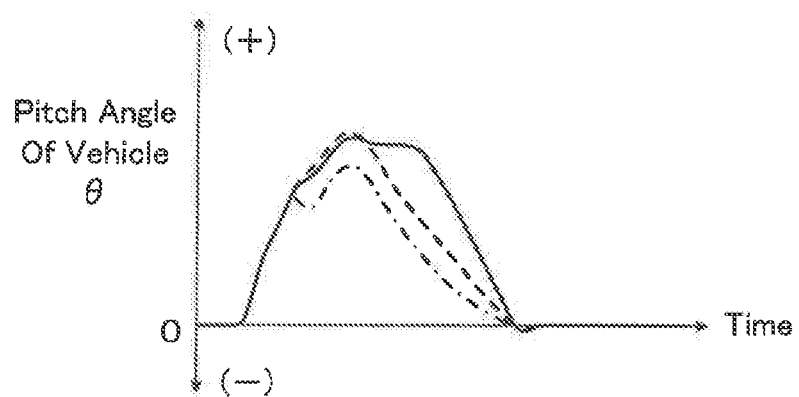
FIG. 5 is a diagram showing a change in a pitch angle θ of a vehicle for the example of FIG. 3.

FIG. 3 shows an example in which the target braking force Fxt and the target regenerative braking force Fxdt change as indicated by the solid line and the broken line, respectively. FIG. 4 shows changes in distribution of the front wheel braking force Fxf and the rear wheel braking force Fxr in the example of FIG. 3, and FIG. 5 shows changes in the pitch angle θ of the vehicle in the example of FIG. 3. In particular, in FIGS. 4 and 5, the solid lines indicate the case of the first embodiment. The broken line shows the case of actual braking force distribution (the case where the front-rear wheel distribution of the braking force is controlled according to the actual braking force distribution line indicated by the thin broken line), and the one-dot chain line shows the case of the ideal braking force distribution (the case where the front-rear wheel distribution of the braking force is controlled according to an ideal braking force distribution line indicated by a thin one-dot chain line). From FIG. 5, it can be seen that according to the first embodiment, it is possible to reduce unnatural changes in the pitch angle θ of the vehicle as compared with the actual braking force distribution and the ideal braking force distribution.

<Example in which No Regenerative Braking is Performed>

Figure 6:
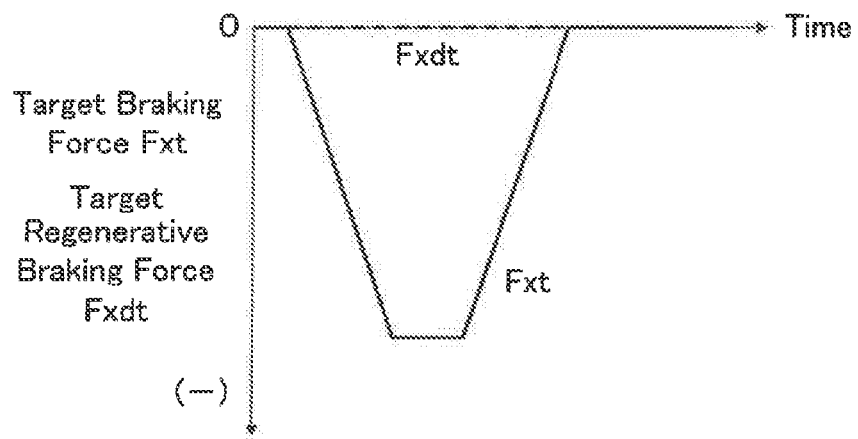
FIG. 6 is a diagram showing another example of changes in a target braking force Fxt (solid line) and a target regenerative braking force Fxdt (broken line) in the first embodiment.
Figure 7:
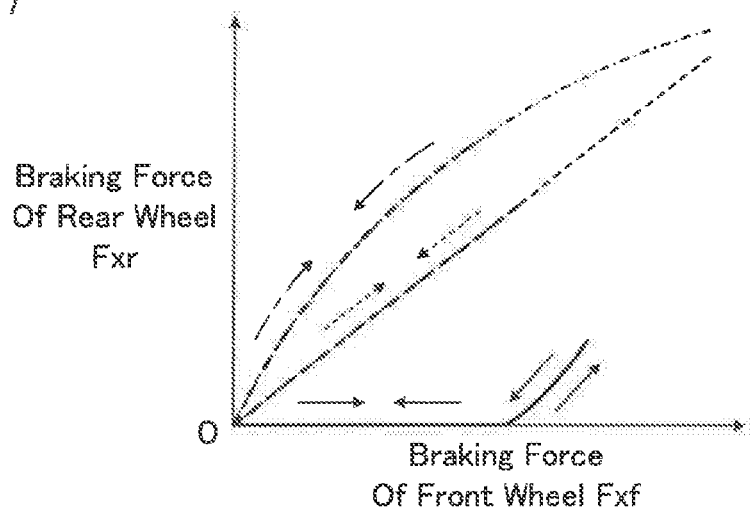
FIG. 7 is a diagram showing changes in distribution of a front wheel braking force Fxf and a rear wheel braking force Fxr for the example of FIG. 6.
Figure 8:
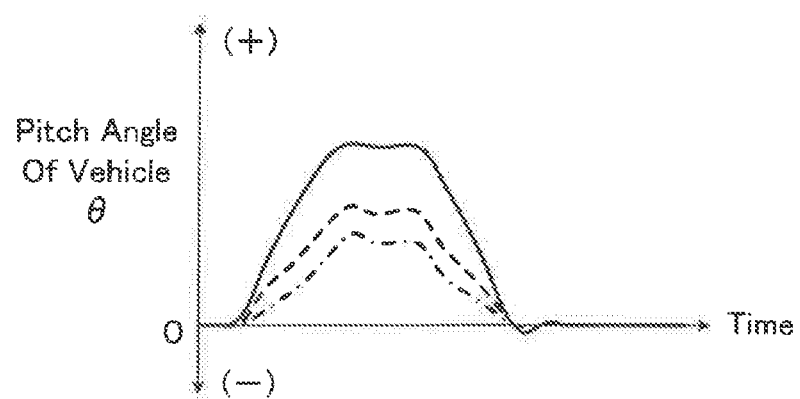
FIG. 8 is a diagram showing a change in a pitch angle θ of the vehicle for the example of FIG. 6.

FIG. 6 shows an example in which the target regenerative braking force Fxdt (broken line) is zero and the target braking force Fxt changes as indicated by the solid line. FIGS. 7 and 8 correspond to FIGS. 4 and 5, respectively. By comparing the solid lines in FIGS. 5 and 8, it can be understood that according to the first embodiment, the change in the pitch angle θ of the vehicle (FIG. 5) in the situation where the regenerative braking is performed can be made similar to the change in the situation where the regenerative braking is not performed (FIG. 8).

Second Embodiment

Figure 9:
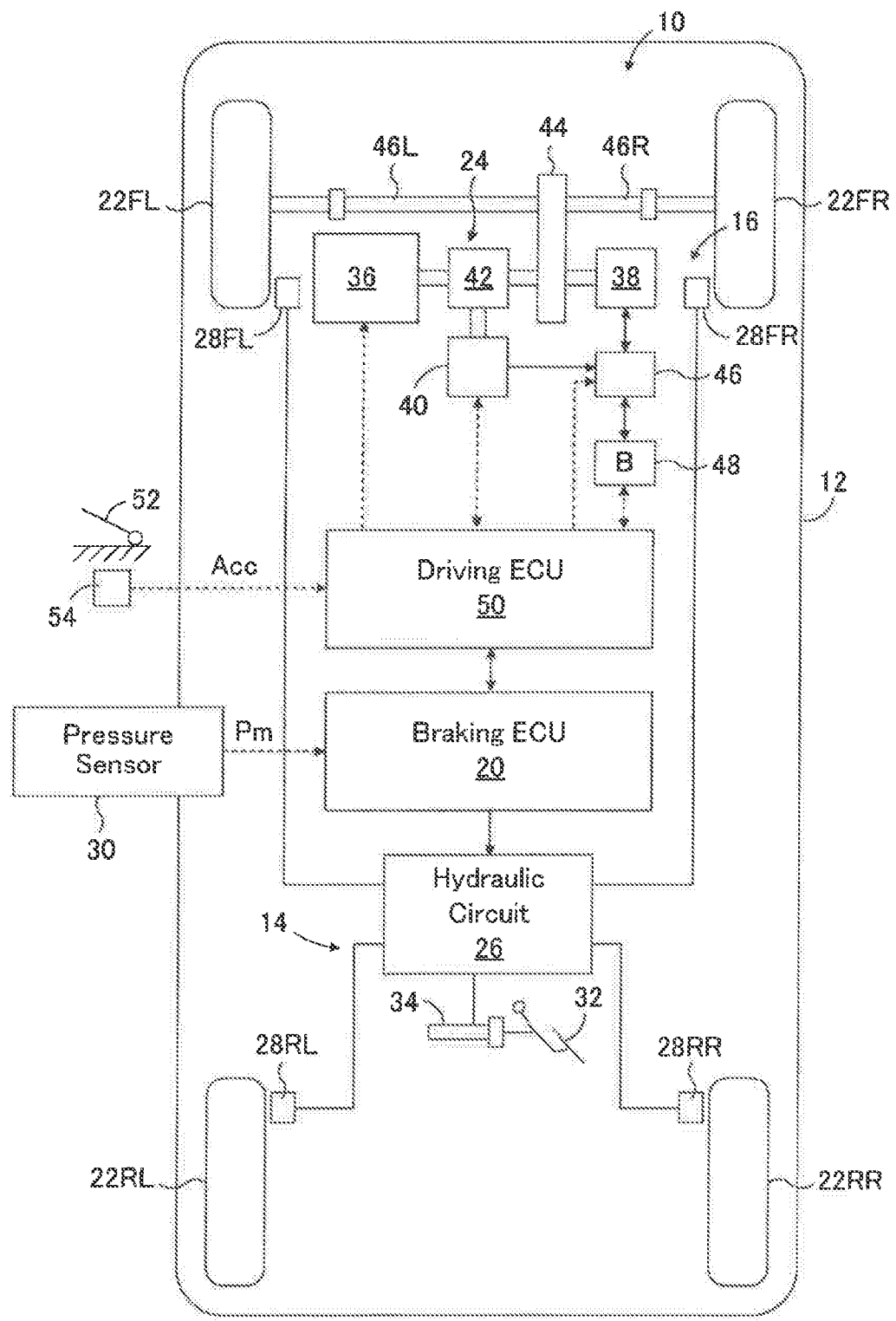
FIG. 9 is a schematic configuration diagram showing a second embodiment of a vehicle braking force control device according to the present disclosure having a front wheel regenerative braking device.

FIG. 9 is a schematic configuration diagram showing a second embodiment of the vehicle braking force control device according to the present invention having a front wheel regenerative braking device. In FIG. 9, the same members as those shown in FIG. 1 are assigned to the same reference numerals as those shown in FIG. 1. This also applies to the later-described third embodiment.

In the second embodiment, the rear wheel regenerative braking device 18 in the first embodiment is not provided. Therefore, no regenerative braking force is applied to the left and right rear wheels 22RL and 22RR, and the regenerative braking forces are applied only to the left and right front wheels 22FL and 22FR by the front wheel regenerative braking device 16. The other points of this embodiment are the same as those of the first embodiment.

Figure 10:
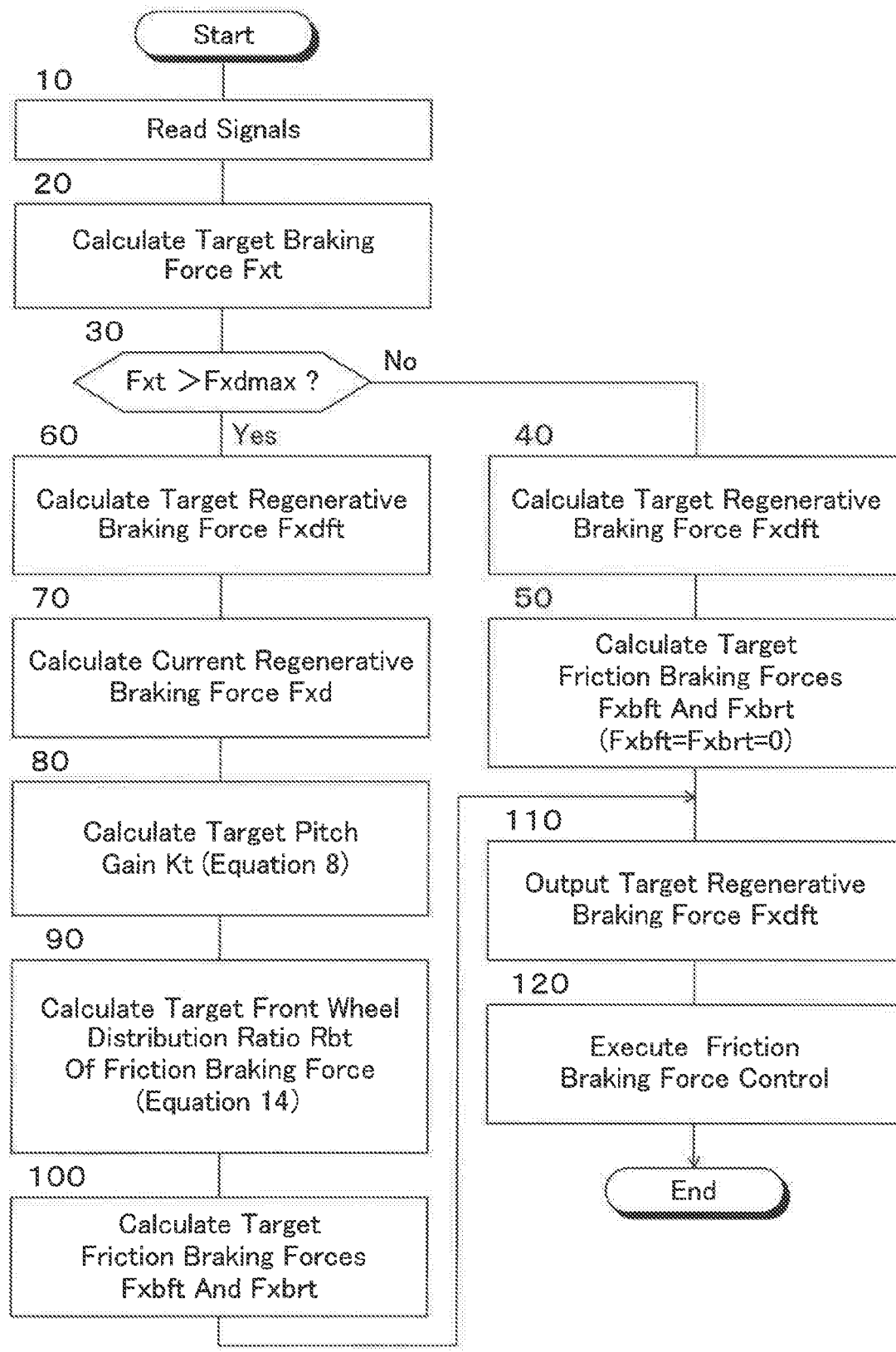
FIG. 10 is a flowchart showing a braking force control routine according to a second embodiment.

In the second embodiment, the braking force control is executed according to the braking force control program corresponding to the flowchart shown in FIG. 10. In FIG. 10, the steps corresponding to the steps shown in FIG. 2 are given the same step numbers as the step numbers given in FIG. 2. This also applies to the later-described third embodiment.

As can be seen from the comparison between FIG. 10 and FIG. 2, steps 10 to 30, 50, 80 to 100 and 120 are executed in the same manner as in the first embodiment. In step 40, a target regenerative braking force Fxdft of the front wheels is calculated in accordance with the aforementioned equation (15) (Rre=1), and a target regenerative braking force Fxdrt of the rear wheels is not calculated.

In step 60, a target regenerative braking force Fxdft of the front wheels is calculated according to the above-described equation (17) (Rre=1), and a target regenerative braking force Fxdrt of the rear wheels is not calculated. In step 70, the current regenerative braking force Fxdf of the front wheels is set as the current regenerative braking force Fxd. In step 110, a signal indicating the target regenerative braking force Fxdft of the front wheels calculated in step 40 or 60 is output to the driving electronic control unit 50.

<Operation of Second Embodiment>

The braking force control apparatus 10 according to the second embodiment configured as described above operates as follows.

<(A2) When the Target Braking Force Fxt is Equal to or Less than the Maximum Regenerative Braking Force Fxdmax>

A negative determination is made in step 30 and steps 40, 50 and steps 110, 120 are executed. Therefore, the regenerative braking force Fxdf for the front wheels is generated by the front wheel regenerative braking device 16. No friction braking force is not generated by the friction braking device 14.

<(B2) When the Target Braking Force Fxt is Larger than the Maximum Regenerative Braking Force Fxdmax>

An affirmative determination is made in step 30 and steps 60 to 100 and steps 110 and 120 are executed. In step 60, a target regenerative braking force Fxdft of the front wheels is calculated, and in step 70, the regenerative braking force Fxdf of the front wheels is set as the current regenerative braking force Fxd. Steps 80 to 100 are executed in the same manner as in the first embodiment.

Further, in step 110, the regenerative braking force Fxdf of the front wheels is controlled so that the regenerative braking force Fxdf of the front wheels becomes the maximum regenerative braking force Fxdmax. In step 120, the friction braking forces Fxbf of the front wheels and the friction braking forces Fxbr of the rear wheels are controlled so that a sum of the friction braking forces Fxbf of the front wheels and the friction braking forces Fxbr of the rear wheels becomes Fxt−Fxdmax and the front wheel distribution ratio of the friction braking force becomes Rbt.

Therefore, as in the first embodiment, in situations where the target braking force Fxt increases beyond the maximum regenerative braking force Fxdmax and decreases in the reverse manner, the target pitch gain Kt is set so that the pitch angle θ of the vehicle changes little by little and smoothly. Accordingly, the pitch angle θ of the vehicle can be changed smoothly when the target braking force Fxt exceeds the maximum regenerative braking force Fxdmax from a value less than the maximum regenerative braking force and changes in the reverse manner, and the possibility that the pitch angle θ of the vehicle unnaturally changes can be reduced.

<Example in which Regenerative Braking is Performed>

Figure 11:
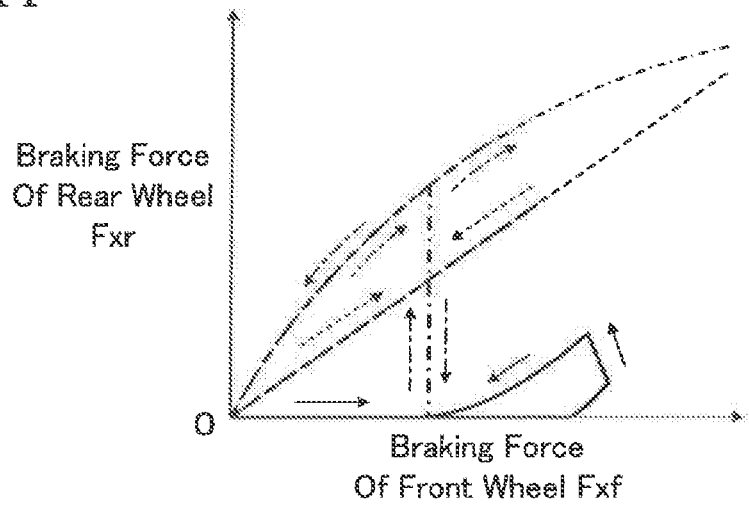
FIG. 11 is a diagram showing variations in the distribution of a front wheel braking force Fxf and a rear wheel braking force Fxr in an example similar to FIG. 3.
Figure 12:
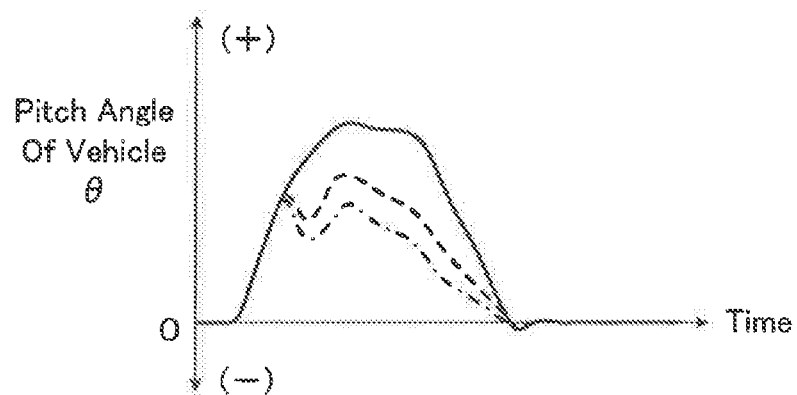
FIG. 12 is a diagram showing a change in a pitch angle θ of a vehicle in an example similar to the example shown in FIG. 3.

FIG. 11 shows a change in distribution of the front wheel braking force Fxf and the rear wheel braking force Fxr in the same example as in FIG. 3, and FIG. 12 shows a change in the pitch angle θ of the vehicle in the same example as in FIG. 3. Particularly, in FIGS. 11 and 12, the solid line indicates the case of the second embodiment. The broken line shows the case of actual braking force distribution and the one-dot chain line shows the case of ideal braking force distribution. From FIG. 12, it can be understood that according to the second embodiment, it is possible to reduce an unnatural change in the pitch angle θ of the vehicle as compared to the cases of the actual braking force distribution and the ideal braking force distribution.

<Example in which No Regenerative Braking is Performed>

Figure 13:
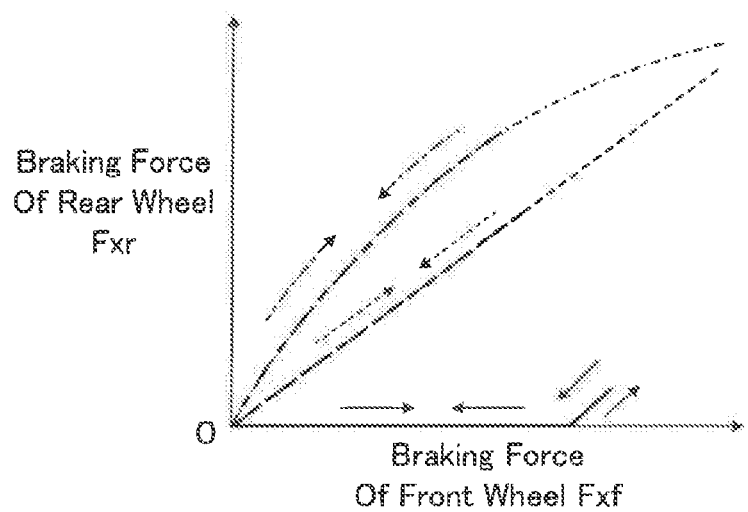
FIG. 13 is a diagram showing changes in the distribution of a front wheel braking force Fxf and rear wheel braking force Fxr for an example similar to the example shown in FIG. 6.
Figure 14:
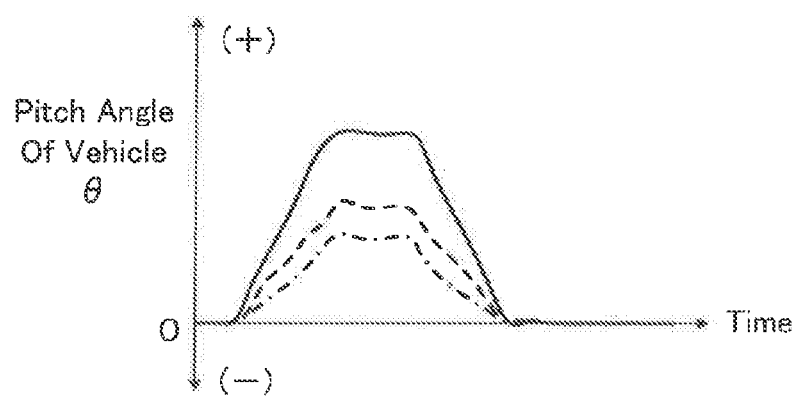
FIG. 14 is a diagram showing a change in a pitch angle θ of a vehicle for an example similar to the example shown in FIG. 6.

FIG. 13 shows variations in the distribution of the front wheel braking force Fxf and the rear wheel braking force Fxr in the same example as in FIG. 6, and FIG. 14 shows a change in the pitch angle θ of the vehicle in the same example as in FIG. 6. By comparing the solid lines in FIGS. 12 and 14, it can be understood that according to the second embodiment, the change in the pitch angle θ of the vehicle (FIG. 12) in the situation where the regenerative braking is performed can be made similar to the change in the situation where the regenerative braking is not performed (FIG. 14).

Third Embodiment

Figure 15:
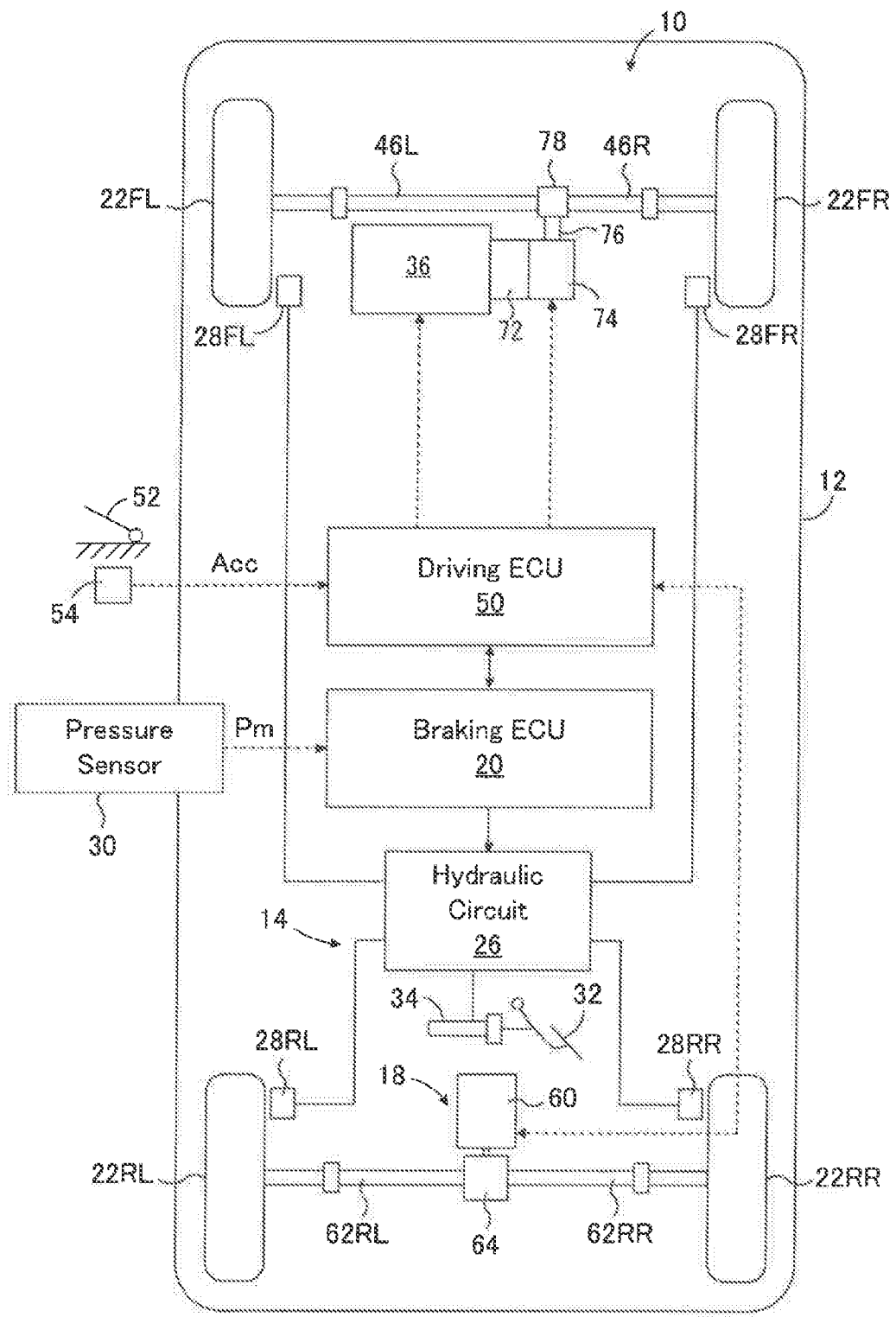
FIG. 15 is a schematic configuration diagram showing a third embodiment of a vehicle braking force control apparatus according to the present disclosure having a rear wheel regenerative braking device.

FIG. 15 is a schematic configuration diagram showing a third embodiment of the braking force control apparatus for a vehicle according to the present disclosure having the rear wheel regenerative braking device.

In the third embodiment, a driving force of the engine 36 is transmitted to an output shaft 76 via a torque converter 72 and a transmission 74 and further transmitted to the drive shafts 46FL and 46FR via a front wheel differential 78 so that the left and right front wheels 22FL and 22FR are rotationally driven. Although the same rear wheel regenerative braking device 18 as in the first embodiment is provided, the front wheel regenerative braking device 16 is not provided. Therefore, no regenerative braking force is applied to the left and right front wheels 22FL and 22FR, and the regenerative braking forces are applied only to the left and right rear wheels 22RL and 22RR by the rear wheel regenerative braking device 18. The other points of this embodiment are the same as those of the first embodiment.

Figure 16:
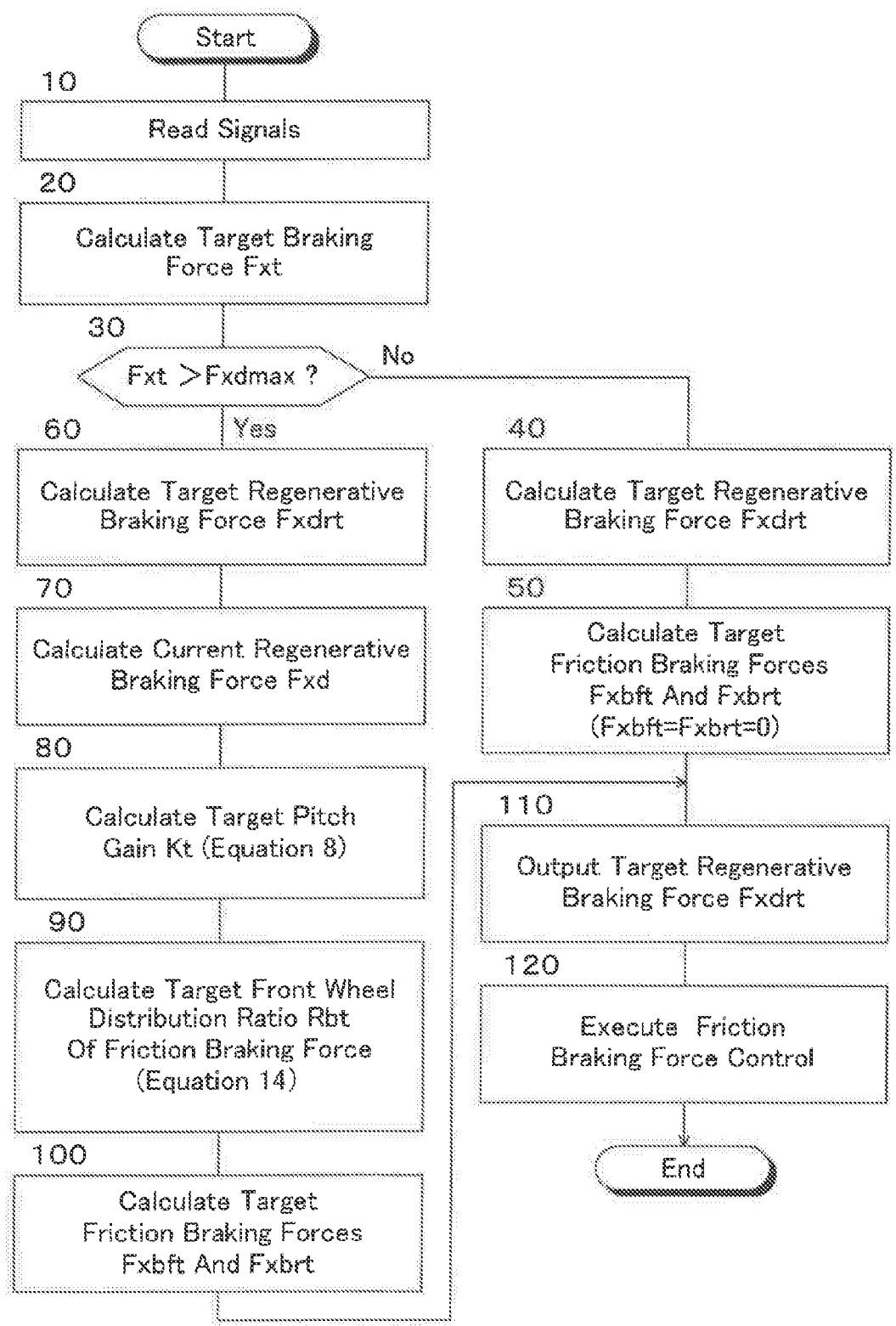
FIG. 16 is a flowchart showing a braking force control routine according to the third embodiment.

In the third embodiment, the braking force control is executed in accordance with the braking force control program corresponding to the flowchart shown in FIG. 16.

As can be seen from comparison between FIG. 16 and FIG. 2, steps 10 to 30, 50, 80 to 100 and 120 are executed in the same manner as in the first embodiment. In step 40, a target regenerative braking force Fxdrt of the rear wheels is calculated in accordance with the aforementioned equation (16) (Rre=0), and a target regenerative braking force Fxdft of the front wheels is not calculated.

In step 60, a target regenerative braking force Fxdrt of the rear wheels is calculated according to the above-described equation (18) (Rre=0), and a target regenerative braking force Fxdft of the front wheels is not calculated. In step 70, the current regenerative braking force Fxdr of the rear wheels is set as the current regenerative braking force Fxd. In step 110, a signal indicating the target regenerative braking force Fxdrt of the rear wheels calculated in step 40 or 60 is output to the driving electronic control unit 50.

<Operation of Third Embodiment>

The braking force control apparatus 10 according to the third embodiment configured as described above operates as follows.

<(A3) When the Target Braking Force Fxt is Equal to or Less than the Maximum Regenerative Braking Force Fxdmax>

A negative determination is made in step 30 and steps 40, 50 and steps 110, 120 are executed. Therefore, the regenerative braking force Fxdr for the rear wheels is generated by the rear wheel regenerative braking device 18. No friction braking force is not generated by the friction braking device 14.

<(B3) When the Target Braking Force Fxt is Larger than the Maximum Regenerative Braking Force Fxdmax>

An affirmative determination is made in step 30 and steps 60 to 100 and steps 110 and 120 are executed. In step 60, a target regenerative braking force Fxdrt of the rear wheels is calculated, and in step 70, the regenerative braking force Fxdr of the rear wheels is set as the current regenerative braking force Fxd. Steps 80 to 100 are executed in the same manner as in the first embodiment.

Further, in step 110, the regenerative braking force Fxdr of the rear wheels is controlled so that the regenerative braking force Fxdr of the rear wheels becomes the maximum regenerative braking force Fxdmax. In step 120, the friction braking forces Fxbf of the front wheels and the friction braking forces Fxbr of the rear wheels are controlled so that a sum of the friction braking forces Fxbf of the front wheels and the friction braking forces Fxbr of the rear wheels becomes Fxt−Fxdmax and the front wheel distribution ratio of the friction braking force becomes Rbt.

Therefore, as in the first embodiment, in situations where the target braking force Fxt increases beyond the maximum regenerative braking force Fxdmax and decreases in the reverse manner, the target pitch gain Kt is set so that the pitch angle $\theta$ of the vehicle changes little by little and smoothly. Accordingly, the pitch angle $\theta$ of the vehicle can be changed smoothly when the target braking force Fxt exceeds the maximum regenerative braking force Fxdmax from a value less than the maximum regenerative braking force and changes in the reverse manner, and the possibility that the pitch angle $\theta$ of the vehicle unnaturally changes can be reduced.

<Example in which Regenerative Braking is Performed>

Figure 17:
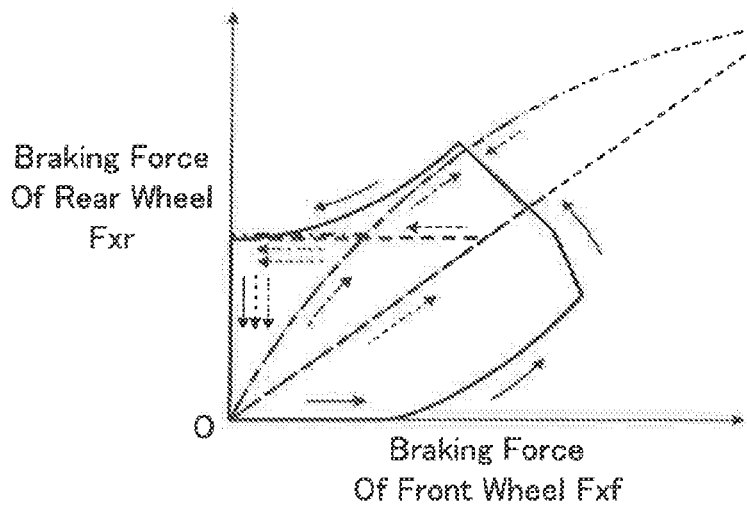
FIG. 17 is a diagram showing changes in distribution of a front wheel braking force Fxf and a rear wheel braking force Fxr in an example similar to FIG. 3.
Figure 18:
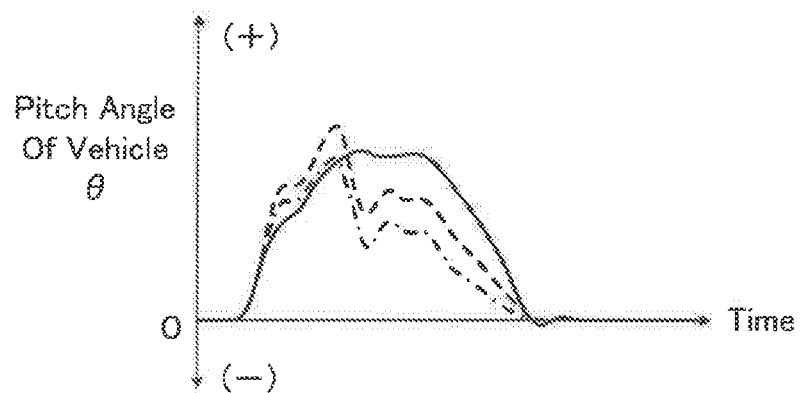
FIG. 18 is a diagram showing a change in pitch angle θ of a vehicle for an example similar to the example shown in FIG. 3.

FIG. 17 shows a change in the distribution of the front wheel braking force Fxf and the rear wheel braking force Fxr in the same example as in FIG. 3, and FIG. 18 shows a change in the pitch angle $\theta$ of the vehicle in the same example as in FIG. 3. Particularly, in FIGS. 17 and 18, the solid line indicates the case of the third embodiment. The broken line shows the case of actual braking force distribution and the one-dot chain line shows the case of ideal braking force distribution. From FIG. 18, it can be understood that according to the third embodiment, it is possible to reduce an unnatural change in the pitch angle $\theta$ of the vehicle as compared to the cases of the actual braking force distribution and the ideal braking force distribution.

<Example in which No Regenerative Braking is Performed>

Figure 19:
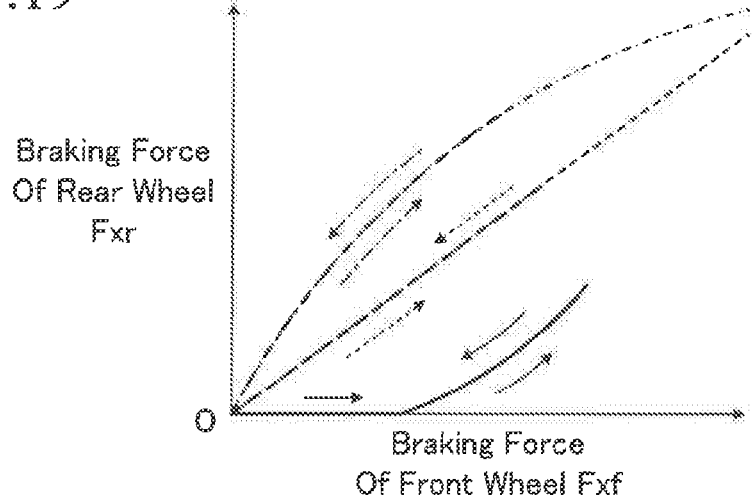
FIG. 19 is a diagram showing changes in the distribution of a front wheel braking force Fxf and a rear wheel braking force Fxr in an example similar to the example shown in FIG. 6.
Figure 20:
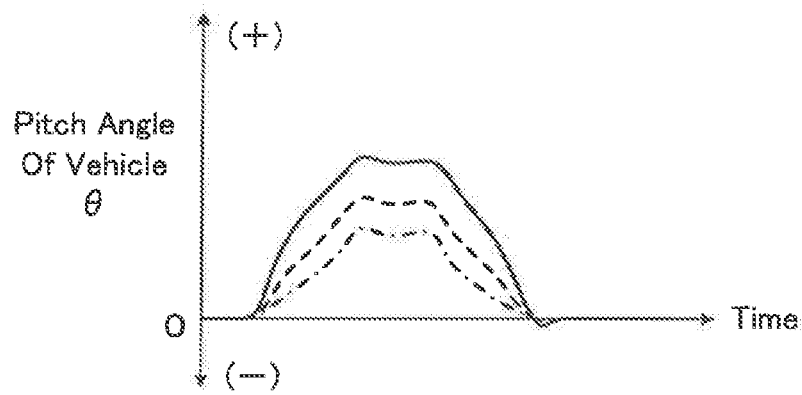
FIG. 20 is a diagram showing a change in a pitch angle θ of a vehicle in an example similar to the example shown in FIG. 6.

FIG. 19 shows variations in the distribution of the front wheel braking force Fxf and the rear wheel braking force Fxr in the same example as in FIG. 6, and FIG. 20 shows a change in the pitch angle $\theta$ of the vehicle in the same example as in FIG. 6. By comparing the solid lines in FIGS. 18 and 20, it can be understood that according to the third embodiment, the change in the pitch angle $\theta$ of the vehicle (FIG. 18) in the situation where the regenerative braking is performed can be made similar to the change in the situation where the regenerative braking is not performed (FIG. 20).

As can be understood from the above description, according to the above-described embodiments, the target pitch gain Kt is calculated according to the above equation (8) which is a quadratic function of the difference Fxt−Fxd between the target braking force Fxt and the regenerative braking force Fxd, and becomes the minimum value when the target braking force Fxt is the preset reference value Fxc. In particular, the target pitch gain Kt is set to the guard value Kde when the target braking force Fxt is equal to or larger than the reference value Fxc.

Therefore, the target pitch gain can be calculated so that as the target braking force Fxt of the vehicle approaches the reference value Fxc, the target pitch gain Kt gradually approaches the guard value Kde which is the desired pitch gain and the rate of change of the gain gradually decreases. Further, even if the target braking force Fxt of the vehicle changes beyond the reference value Fxc, the pitch attitude of the vehicle can be made constant. Therefore, it is possible to prevent the pitch attitude of the vehicle from unnaturally fluctuating, and to prevent the pitch angle $\theta$ of the vehicle from becoming excessive in a situation where the target braking force Fxt of the vehicle is larger than the reference value Fxc.

As described above, when the front-rear wheel distribution ratio of the regenerative braking force Fxd and/or the front-rear wheel distribution ratio of the friction braking force Fxb changes due to the change in the ratio of the friction braking force Fxb and the regenerative braking force Fxd, the pitch angle $\theta$ of the vehicle changes. According to the embodiments described above, the front-rear wheel distribution ratio of the friction braking force Fxb is controlled so that the pitch gain becomes the target pitch gain Kt, whereby an unnatural change in the pitch angle θ of the vehicle caused by a change in ratio of the friction braking force and the regenerative braking force and/or the front-rear wheel distribution ratio of the regenerative braking force Fxd is cancelled by a change in the pitch angle caused by a change in the front-rear wheel distribution ratio of the friction braking force Fxb.

Modified Example

In the first to third embodiments described above, the target pitch gain Kt is calculated according to the above equation (8) which is a quadratic function of a difference Fxt−Fxd between the target braking force Fxt and the regenerative braking force Fxd. However, if it is prevented that the target braking force Fxt of the vehicle changes stepwise in the region exceeding the maximum regenerative braking force Fxdmax, the possibility that the pitch angle θ of the vehicle unnaturally changes can be reduced.

Therefore, the target pitch gain Kt may be calculated by a linear function expressed by the following equation (22), with G being a positive constant coefficient. According to this modified example, the target pitch gain Kt changes, for example, as indicated by a two-dot chain line in FIG. 25, and as compared with the first to third embodiments, it is possible to simply calculate the gain Kt. In this modification example, it is preferable that the target pitch gain Kt is guarded so as not to exceed the maximum value Kre and less than the guard value Kde.

$$Kt=Kre-G(Fxt-Fxd) \quad (22)$$

Further, it is preferable that as the target braking force Fxt of the vehicle approaches the reference value Fxc, the target pitch gain Kt gradually approaches the guard value Kde which is a desired pitch gain and the rate of change of the target pitch gain gradually decreases. Therefore, the target pitch gain Kt may be calculated by a higher-order function such as an elliptic function, or by a plurality of linear functions whose coefficients change step by step.

Although the present disclosure has been described in detail with reference to specific embodiments and modified examples, it will be apparent to those skilled in the art that the present disclosure is not limited to the above-described embodiments and modified examples, and various other embodiments are possible within the scope of the present disclosure.

For example, in the above-described first and second embodiments, the front wheel regenerative braking device 16 is a part of the hybrid system 24, but the front wheel regenerative braking device may be provided separately from a driving device such as an engine for driving the left and right front wheels.

Further, in the above-described first and second embodiments, the hybrid system 24 including the front wheel regenerative braking device 16 is a two-motor hybrid system, but may be a single motor type hybrid system.

Further, in the above-described first and second embodiments, the front wheel regenerative braking device 16 is a part of the hybrid system 24 and the vehicle 12 is a front wheel drive vehicle. However, the vehicle may be a rear wheel drive vehicle whose rear wheels are driven by an engine or the like and the front wheels may be adapted to be provided with a regenerative braking force by such a regenerative braking device as the rear wheel regenerative braking device 18 of the third embodiment.

Further, in the above-described third embodiment, the vehicle 12 is a front wheel drive vehicle in which the left and right front wheels are driven by the engine 36. However, the front wheels may be driven wheels and the rear wheels may be provided with driving force and regenerative braking force by such a hybrid system including a regenerative braking device as the hybrid system 24 in the first embodiment.

What is claimed is:

1. A braking force control apparatus for a vehicle comprising:
    a friction braking device, including a hydraulic circuit and wheel cylinders for each of a left and right front wheel and a left and right rear wheel, configured to impart friction braking forces to the left and right front wheels and the left and right rear wheels;
    a regenerative braking device including at least one of
    a front wheel regenerative braking device, including an electric motor, a speed reducer, and an inverter, that is configured to apply regenerative braking forces to the left and right front wheels, and
    a rear wheel regenerative braking device, including a motor generator and a rear wheel differential gear unit, that is configured to apply regenerative braking forces to the left and right rear wheels; and
    the braking force control apparatus further comprising a control unit, including a processor programmed to:
    control the friction braking device and the regenerative braking device so that a total of the regenerative braking forces becomes a target braking force of the vehicle when the target braking force of the vehicle is equal to or less than a maximum regenerative braking force of the regenerative braking device,
    control the friction braking device and the regenerative braking device so that the total of the regenerative braking forces becomes the maximum regenerative braking force and the total of the friction braking forces becomes a difference between the target braking force of the vehicle and the maximum regenerative braking force when the target braking force of the vehicle is larger than the maximum regenerative braking force,
    calculate a first target pitch gain of the vehicle so that a pitch gain of the vehicle changes in accordance with a difference between the target braking force of the vehicle and the total of the regenerative braking forces when the target braking force of the vehicle exceeds the maximum regenerative braking force and the target braking force increases or decreases while remaining at a value that is larger than the maximum regenerative braking force,
    control a front-rear wheel distribution ratio of the friction braking force so that the pitch gain of the vehicle becomes the first target pitch gain and a total of the friction braking forces becomes a difference between the target braking force of the vehicle and the maximum regenerative braking force, and
    wherein the pitch gain is a gain of a braking force with respect to a pitch angle of the vehicle.

2. The braking force control apparatus for a vehicle according to claim 1, wherein the control unit is further programmed to calculate the first target pitch gain by utilizing a function having a difference between the target braking force of the vehicle and a total of the regenerative braking forces as a variable, so that the pitch gain of the vehicle, when the target braking force of the vehicle exceeds the maximum regenerative braking force and when the target braking force increases while remaining at a value that is larger than the maximum regenerative braking force, approaches a second target pitch gain.

3. The braking force control apparatus for a vehicle according to claim 2, wherein when the target braking force of the vehicle is a preset braking force, the first target pitch gain calculated by the function is equal to the second target pitch gain.

4. The braking force control apparatus for a vehicle according to claim 3, wherein when the target braking force of the vehicle is larger than the preset braking force, the first target pitch gain is set to the second target pitch gain.

5. The braking force control apparatus for a vehicle according to claim 1, wherein the control unit is further programmed to calculate the first target pitch gain as a sum of the pitch gain of the vehicle, when the target braking force of the vehicle equal is to or less than the maximum regenerative braking force, and a pitch gain correction amount, that is proportional to a difference between the target braking force and a total of the regenerative braking forces of the vehicle.

6. The braking force control apparatus for a vehicle according to claim 5, wherein the pitch gain correction amount is a product of a difference between the target braking force of the vehicle and the total of the regenerative braking forces, and a constant coefficient.

7. The braking force control apparatus for a vehicle according to claim 1, wherein the control unit is further programmed to:
- calculate a target front-rear wheel distribution ratio of the friction braking force on a basis that a target pitch angle of the vehicle, determined by the target braking force of the vehicle and the first target pitch gain, is equal to a sum of a regenerative braking pitch angle of the vehicle and a friction braking pitch angle of the vehicle, and
- calculate target friction braking forces of the front wheels and the rear wheels based on the target front-rear wheel distribution ratio of the friction braking forces and a difference between the target braking force of the vehicle and the maximum regenerative braking force, and to control friction braking forces of the front wheels and the rear wheels based on the target friction braking forces of the front wheels and the rear wheels, respectively,
wherein the regenerative braking pitch angle of the vehicle is determined by a total of the regenerative braking forces and a front-rear wheel distribution ratio of the regenerative braking forces, and
wherein the friction braking pitch angle of the vehicle is determined by a total of the friction braking forces and a front-rear wheel distribution ratio of the friction braking forces.

* * * * *